United States Patent
Jo et al.

(10) Patent No.: US 11,264,714 B2
(45) Date of Patent: Mar. 1, 2022

(54) METHOD AND APPARATUS FOR BEAMFORMING IN WIRELESS COMMUNICATION SYSTEM

(71) Applicant: Samsung Electronics Co., Ltd., Suwon-si (KR)

(72) Inventors: Ohyun Jo, Seoul (KR); Jae-Hwa Kim, Hwaseong-si (KR); Sang-Hyun Chang, Seoul (KR); Chang-Yeul Kwon, Seongnam-si (KR); Dong-Hwi Roh, Seoul (KR); Ji-Sung Oh, Seongnam-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 284 days.

(21) Appl. No.: 16/119,552

(22) Filed: Aug. 31, 2018

(65) Prior Publication Data

US 2018/0375559 A1 Dec. 27, 2018

Related U.S. Application Data

(63) Continuation of application No. 14/549,354, filed on Nov. 20, 2014, now Pat. No. 10,097,252.

(30) Foreign Application Priority Data

Nov. 20, 2013 (KR) .......................... 10-2013-0141225

(51) Int. Cl.
*H01Q 3/26* (2006.01)
*H04B 7/06* (2006.01)
(Continued)

(52) U.S. Cl.
CPC .......... *H01Q 3/2605* (2013.01); *H01Q 1/1257* (2013.01); *H01Q 3/02* (2013.01);
(Continued)

(58) Field of Classification Search
CPC ............................ H04B 7/0617; H01Q 3/2605
See application file for complete search history.

(56) References Cited

U.S. PATENT DOCUMENTS 5,166,693 A * 11/1992 Nishikawa ........... H01Q 1/3233
                                                    342/354
5,327,143 A *  7/1994 Goetz ...................... G01S 3/14
                                                    342/158
(Continued)

FOREIGN PATENT DOCUMENTS

JP          2007244580 A      9/2007
JP          2008183184 A      8/2008
(Continued)

OTHER PUBLICATIONS

Cordeiro, Carlos & Akhmetov, Dmitry & Park, Minyoung. (2010). IEEE 802.11ad: Introduction and performance evaluation of the first multi-Gbps WiFi technology. 3-8. 10.1145/1859964.1859968. (Year: 2010).*

(Continued)

*Primary Examiner* — Gregory C. Issing

(57) ABSTRACT

A method and apparatus for beamforming in a wireless communication system are provided. The method of supporting beamforming in a wireless communication device includes detecting a direction change of the wireless communication device while communicating with a peer device. The method of supporting beamforming in a wireless communication device also includes adjusting a beam direction for communication with the peer device based on information indicating a direction change of the wireless communication device.

10 Claims, 17 Drawing Sheets

(51) Int. Cl.
  *H01Q 1/12* (2006.01)
  *H01Q 3/02* (2006.01)
  *H04B 7/08* (2006.01)

(52) U.S. Cl.
  CPC ............ *H01Q 3/26* (2013.01); *H04B 7/0619* (2013.01); *H04B 7/0695* (2013.01); *H04B 7/088* (2013.01); *H04B 7/0617* (2013.01)

(56) References Cited

U.S. PATENT DOCUMENTS

| | | | | |
|---|---|---|---|---|
| 5,900,836 | A * | 5/1999 | Nishikawa | H01Q 1/1257 342/359 |
| 6,195,559 | B1 * | 2/2001 | Rapeli | H01Q 1/242 342/359 |
| 6,278,405 | B1 * | 8/2001 | Ha | G01S 3/38 342/359 |
| 6,697,642 | B1 * | 2/2004 | Thomas | H01Q 3/2605 342/374 |
| 6,917,337 | B2 * | 7/2005 | Iida | H01Q 1/241 343/702 |
| 7,710,319 | B2 | 5/2010 | Nassiri-Toussi et al. | |
| 7,929,918 | B2 * | 4/2011 | Niu | H01Q 3/26 455/69 |
| 9,318,805 | B2 * | 4/2016 | Jia | H04L 1/0027 |
| 9,681,311 | B2 | 6/2017 | Hyde et al. | |
| 2006/0094485 | A1 * | 5/2006 | Goldberg | H04B 7/0408 455/575.7 |
| 2006/0152410 | A1 | 7/2006 | Shi | |
| 2006/0232468 | A1 | 10/2006 | Parker et al. | |
| 2008/0119737 | A1 | 5/2008 | Urbano et al. | |
| 2009/0315760 | A1 * | 12/2009 | Mousavi Bafrooei | H04B 7/18508 342/174 |
| 2010/0164802 | A1 | 7/2010 | Li et al. | |
| 2010/0302101 | A1 * | 12/2010 | Leiba | H01Q 1/1257 342/359 |
| 2011/0210891 | A1 * | 9/2011 | Pathmasuntharam | H04B 7/086 342/359 |
| 2011/0238286 | A1 * | 9/2011 | Roesser | G01C 21/32 701/532 |
| 2012/0064841 | A1 * | 3/2012 | Husted | H01Q 1/2291 455/78 |
| 2012/0179037 | A1 | 7/2012 | Halmann | |
| 2013/0039345 | A1 * | 2/2013 | Kim | H04W 72/0413 370/332 |
| 2013/0040655 | A1 * | 2/2013 | Keidar | H01Q 1/246 455/456.1 |
| 2013/0040682 | A1 * | 2/2013 | Chang | H04W 76/27 455/517 |
| 2017/0195893 | A1 * | 7/2017 | Lee | H04L 5/006 |

FOREIGN PATENT DOCUMENTS

| | | | |
|---|---|---|---|
| KR | 10-2000-0070406 A | 11/2000 | |
| KR | 10-2013-0018079 A | 2/2013 | |
| WO | WO-2012176217 A1 * | 12/2012 | ............ H01Q 3/00 |

OTHER PUBLICATIONS

Korean Intellectual Property Office, "Notice of Preliminary Rejection," Application No. KR 10-2013-0141225, dated Jan. 17, 2020, 8 pages.

Notice of Patent Grant in connection with Korean Application No. 10-2013-0141225 dated Jun. 12, 2020, 4 pages.

* cited by examiner

<Direction IE>

| element ID | Length | Azimuth Φ offset | Elevation Θ offset | x distance offset | y distance offset | z distance offset |
|---|---|---|---|---|---|---|
| 511 | 513 | 515 | 517 | 519 | 521 | 523 |

FIG.5B

<Reduced BF IE>

| element ID | Length | Number of antenna | training sectors of antenna 1 | training sectors of antenna 2 | ... | training sectors of antenna N |
|---|---|---|---|---|---|---|
| 531 | 533 | 535 | 537 | 539 | | 541 |

FIG.5C

METHOD AND APPARATUS FOR BEAMFORMING IN WIRELESS COMMUNICATION SYSTEM

CROSS-REFERENCE TO RELATED APPLICATIONS

The present application is a continuation of application Ser. No. 14/549,354, filed Nov. 20, 2014, which is based on and claims priority under 35 U.S.C. § 119 to Korean Patent Application No. 10-2013-0141225, filed Nov. 20, 2013, the disclosures of which are hereby incorporated by reference in their entirety.

BACKGROUND

1. Field

The present disclosure relates to a method and apparatus for beamforming in a wireless communication system.

2. Description of Related Art

In a wireless communication system, by concentrating transmitting and receiving power at a narrow space, a research for applying beamforming technology that increases transmitting and receiving efficiency of an antenna is actively performed. For example, discussion for applying beamforming technology to a medical ultrasonic wave system can be performed.

In a wireless medical ultrasonic wave system that supports beamforming technology of an analog method, in each of a probe device and a system device, an array antenna including a plurality of antenna elements can be provided. In this case, by changing a phase of each antenna element, each of the probe device and the system device can enable energy of a radio wave to physically concentrate in a constant direction, and as the number of antenna elements increases, each of the probe device and the system device can minutely adjust a direction of a beam through beam training.

In order to minutely adjust a beam in an entire direction, each of a probe device and a system device should include as many antenna elements as possible. However, as an antenna element substantially increases, it is very difficult to technically implement this, and a cost increases, and thus it is difficult to have many antenna elements that can minutely adjust a beam in an entire direction. Therefore, in the probe device, because it is difficult to transmit and receive a signal in an entire direction, when the probe device dynamically changes a direction thereof by a user, it has a high failure possibility to transmit and receive a signal to and from the system device.

SUMMARY

To address the above-discussed deficiencies, it is a primary object to provide a method and apparatus for beamforming in a wireless communication system.

Another aspect of the present disclosure is to provide a method and apparatus for performing beam training by detecting a direction change event in a probe device that supports beamforming.

Another aspect of the present disclosure is to provide a method and apparatus for limiting a search area for performing beam training and performing beam training in the limited search area based on a previously used beam direction and direction change information, when a direction change is detected in a probe device that supports beamforming.

Another aspect of the present disclosure is to provide a method and apparatus for determining a beam direction by performing beam training based on electrical beamforming and for performing mechanical beamforming based on the determined electrical beam direction, when a direction change is detected in a probe device that supports beamforming.

Another aspect of the present disclosure is to provide a method and apparatus for performing mechanical beamforming based on direction change information detected by a direction sensor, when changing a direction of a probe device that supports beamforming.

In a first embodiment, a method of supporting beamforming in a wireless communication device is provided. The method includes detecting a direction change of the wireless communication device while communicating with a peer device. The method also includes adjusting a beam direction for communication with the peer device based on information indicating a direction change of the wireless communication device.

In a second embodiment, an apparatus that supports beamforming in a wireless communication device is provided. The apparatus includes a controller configured to detect a direction change of the wireless communication device while communicating with peer device. The controller is also configured to adjust a beam direction for communication with the other device based on information indicating a direction change of the wireless communication device. The apparatus also includes a transceiver configured to form a beam according to the control of the controller to transmit and receive a signal.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 5A, 5B, and 5C are diagrams illustrating an example message format for reduced beamforming in a wireless communication system according to this disclosure;

DETAILED DESCRIPTION

Figure 1:
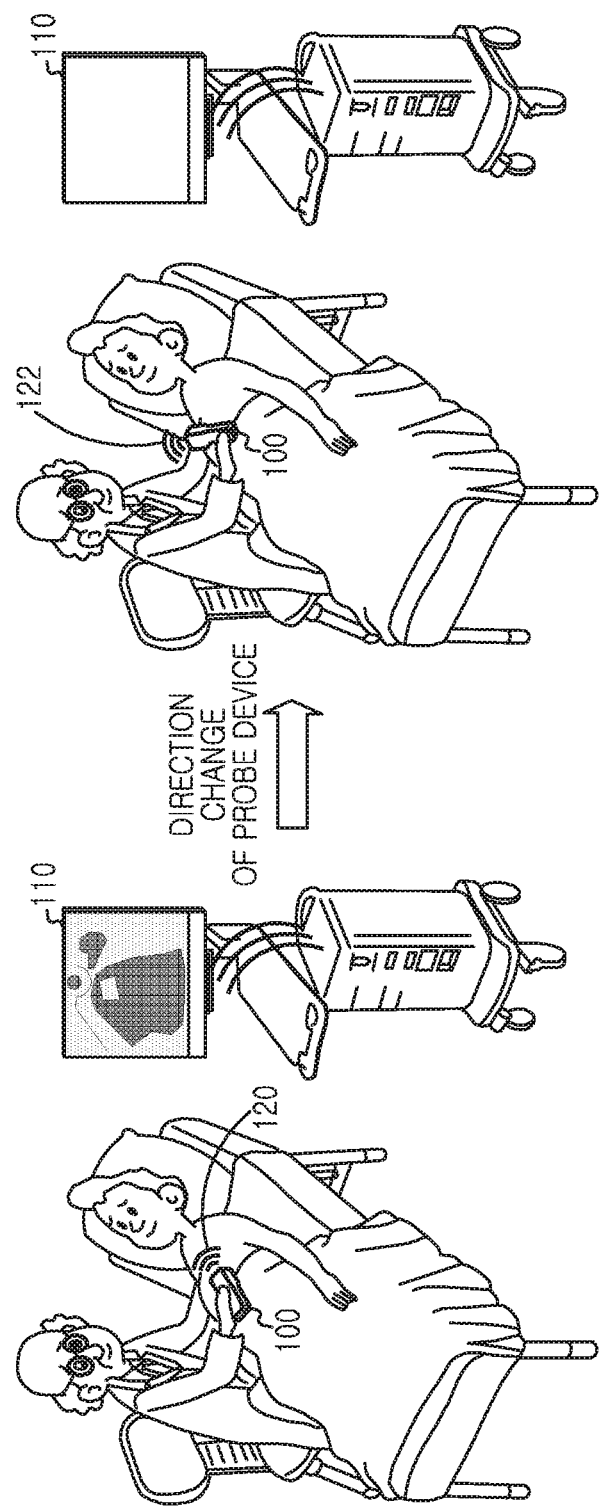
FIG. 1 is a diagram illustrating an example of changing a direction of a probe device in a general wireless ultrasonic wave system according to this disclosure.

FIGS. 1 through 15, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Hereinafter, exemplary embodiments of the present disclosure will be described in detail with reference to the accompanying drawings. Detailed descriptions of well-known functions and structures incorporated herein may be omitted to avoid obscuring the subject matter of the present disclosure. Further, the terms used herein are defined in consideration of functions of the present disclosure and may vary depending on a user's or an operator's intension and usage. Therefore, the terms used herein should be understood based on the descriptions made herein.

In the present disclosure, an expression such as "having," "may have," "comprising," or "may comprise" indicates existence of a corresponding characteristic (such as an element such as a numerical value, function, operation, or component) and does not exclude existence of additional characteristic.

In the present disclosure, an expression such as "A or B," "at least one of A or/and B," or "one or more of A or/and B" may include all possible combinations of together listed items. For example, "A or B," "at least one of A and B," or "one or more of A or B" may indicate the entire of (1) including at least one A, (2) including at least one B, or (3) including both at least one A and at least one B.

Expressions such as "first," "second," "primarily," or "secondary," used in various exemplary embodiments may represent various elements regardless of order and/or importance and do not limit corresponding elements. The expressions may be used for distinguishing one element from another element. For example, a first user device and a second user device may represent different user devices regardless of order or importance. For example, a first element may be referred to as a second element without deviating from the scope of the present disclosure, and similarly, a second element may be referred to as a first element.

When it is described that an element (such as a first element) is "operatively or communicatively coupled" to or "connected" to another element (such as a second element), the element can be directly connected to the other element or can be connected to the other element through a third element. However, when it is described that an element (such as a first element) is "directly connected" or "directly coupled" to another element (such as a second element), it means that there is no intermediate element (such as a third element) between the element and the other element.

An expression "configured to (or set)" used in the present disclosure may be replaced with, for example, "suitable for," "having the capacity to," "designed to," "adapted to," "made to," or "capable of" according to a situation. A term "configured to (or set)" does not always mean only "specifically designed to" by hardware. Alternatively, in some situation, an expression "apparatus configured to" may mean that the apparatus "can" operate together with another apparatus or component. For example, a phrase "a processor configured (or set) to perform A, B, and C" may be a generic-purpose processor (such as a CPU or an application processor) that can perform a corresponding operation by executing at least one software program stored at an exclusive processor (such as an embedded processor) for performing a corresponding operation or at a memory device.

Terms defined in the present disclosure are used for only describing a specific exemplary embodiment and may not have an intention to limit the scope of other exemplary embodiments. When using in a description of the present disclosure and the appended claims, a singular form may include a plurality of forms unless it is explicitly differently represented. Entire terms including a technical term and a scientific term used here may have the same meaning as a meaning that may be generally understood by a person of common skill in the art. It may be analyzed that generally using terms defined in a dictionary have the same meaning as or a meaning similar to that of a context of related technology and are not analyzed as an ideal or excessively formal meaning unless explicitly defined. In some case, terms defined in the present disclosure cannot be analyzed to exclude the present exemplary embodiments.

In the following description, in a wireless communication system that supports beamforming technology, when changing a direction of a wireless communication device, a method and apparatus for performing beamforming will be described. In the following description, a case of performing beamforming between a probe device and a system device is exemplified. However, the following exemplary embodiments are not limited thereto and may be applied to various wireless communication devices having mobility while supporting beamforming technology. For example, a wireless communication device according to an exemplary embodiment of the present disclosure can include at least one of a smart phone, a tablet Personal Computer (PC), a mobile phone, a video phone, an e-book reader, a netbook computer, a Personal Digital Assistant (PDA), a Portable Multimedia Player (PMP), a Moving Picture Experts Group layer-3 (MP3) player, a mobile medical device, a camera, a wearable device, an electronic clock, and a wrist watch. Further, it will become apparent to a person of ordinary skill in the art that the wireless communication device is not limited to the above described device.

FIG. 1 is a diagram illustrating an example of changing a direction of a probe device in a general wireless ultrasonic wave system according to this disclosure.

Referring to FIG. 1, in a general wireless ultrasonic wave system, a direction of a probe device 100 is dynamically changed by the control of a user. For example, while the probe device 100 transmits and receives a signal, by forming (120) a transmitting and receiving beam in a location direction of a system device 110, a direction thereof is changed by a user control. In this case, a transmitting and receiving beam 122 of the probe device 100 is formed in a direction opposite to a direction of the system device 110, and thus a situation in which communication between the probe device 100 and the system device 110 is disconnected occurs. Therefore, in an exemplary embodiment of the present disclosure, a method of determining and changing a transmitting and receiving beam direction for communication with the system device 110 when changing a direction of the probe device 100 is described herein. Here, the probe device 100 is a wireless communication medical device that performs a function of receiving an ultrasonic wave signal reflected from a target and converting the ultrasonic wave signal to an electrical image signal, and the system device 110 is a wireless communication medical device that receives an electrical image signal from the probe device 100 and that outputs the electrical image signal through a screen. However, when performing exemplary embodiments described hereinafter, a function of receiving an ultrasonic wave signal and converting the ultrasonic wave signal to an electrical image signal and of receiving an electrical image signal and outputting the electrical image signal on a screen is not always necessary. For example, exemplary embodiments described herein can be applied to an entire wireless communication device having mobility without relation to an ultrasonic wave system and that can communicate with another device through beamforming.

Figure 2:
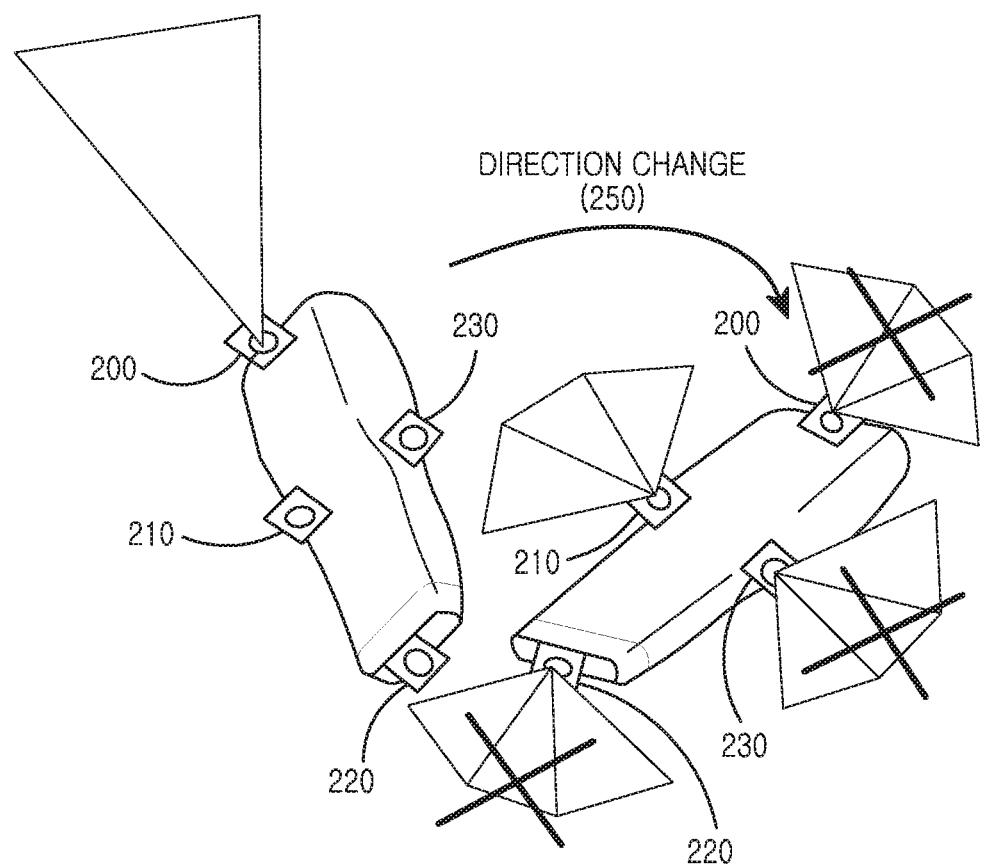
FIG. 2 is a diagram illustrating an example of performing beam training in a limited search area by detecting a direction change in a wireless probe device according to this disclosure.

FIG. 2 is a diagram illustrating an example of performing beam training in a limited search area by detecting a direction change in a wireless probe device according to this disclosure.

Referring to FIG. 2, a probe device according to an exemplary embodiment of the present disclosure includes a plurality of antennas 200, 210, 220, and 230 and forms a transmitting and receiving beam in a specific direction through each antenna. Here, the antenna includes a beam antenna or an array antenna that can form a beam in a specific direction. Further, the probe device includes a direction sensor (or an operation detection sensor) and detects a direction change (250) of the probe device.

A probe device determines a search area in which beam training is to be performed based on direction change information detected by a direction sensor and a transmitting and receiving beam direction communicated with a system device before a direction change. For example, the probe device forms a transmitting and receiving beam in a first direction through the first antenna 200, and when a direction change of the probe device is detected (250) while communicating with the system device, the probe device selects the second antenna 210 that forms a beam in a first direction based on a transmitting and receiving beam index of the using first antenna 200 and changed direction information of the probe device and performs beam training in beam directions that can form through the second antenna 210, thereby determining a transmitting and receiving beam direction.

Here, the number and a location of an antenna of the probe device illustrated in FIG. 2 are an illustration, and the following description is not limited to a structure illustrated in FIG. 2, but can be applied to various structures. For example, the following description can be applied to a case in which the probe device includes an array antenna or a case in which the probe device includes a plurality of array antennas at a specific location.

Figure 3:
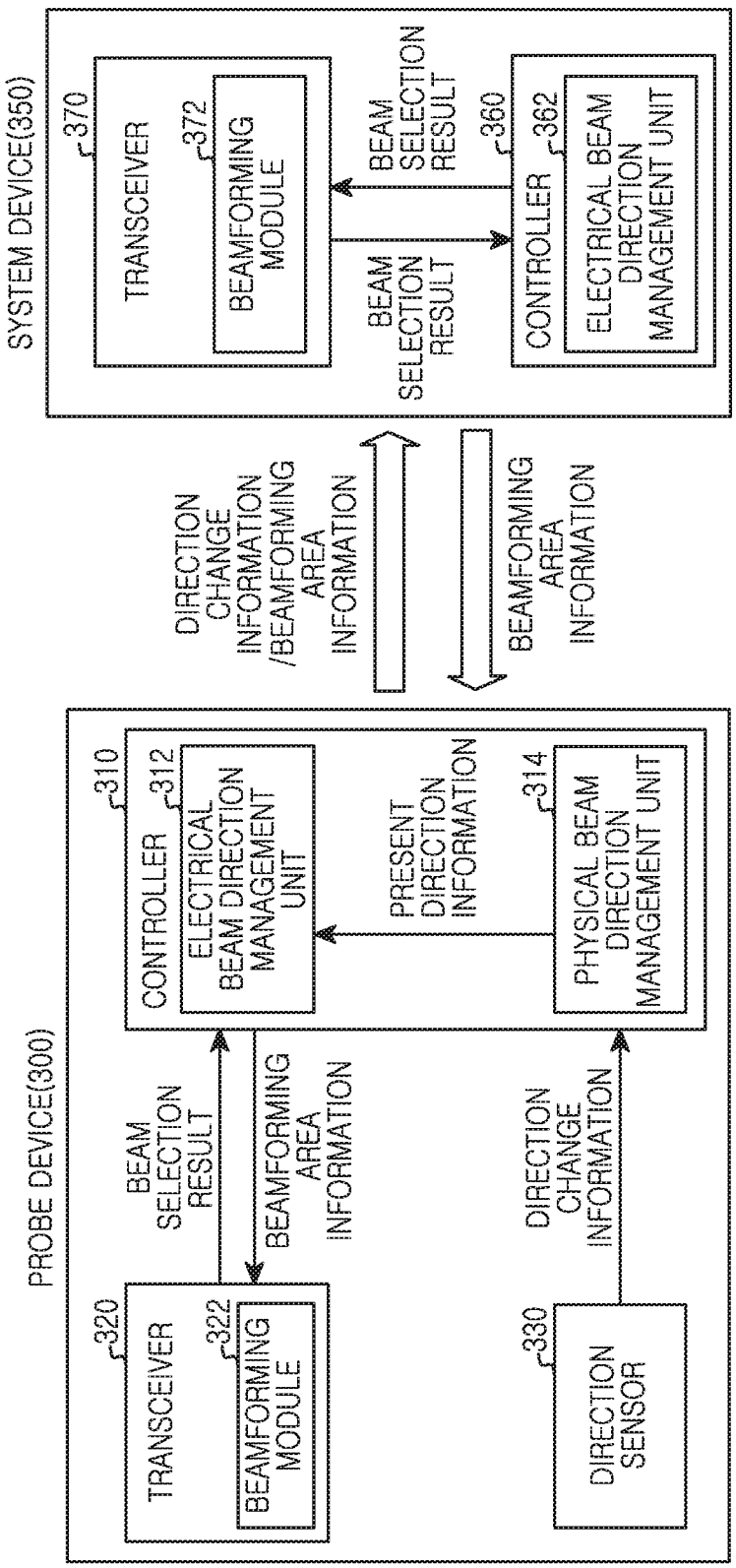
FIG. 3 is a block diagram illustrating an example configuration of a wireless probe device and an example system device according to this disclosure.

FIG. 3 is a block diagram illustrating a configuration of a probe device and a system device according to this disclosure.

Referring to FIG. 3, a probe device 300 includes a controller 310, a transceiver 320, and a direction sensor 330.

The controller 310 performs a control function for general operations of the probe device 300. For example, the controller 310 performs a function necessary for an ultrasonic wave signal processing and controls and processes a function for performing beamforming according to a direction change of the probe device 300.

The controller 310 includes an electrical beam direction management unit 312 and a physical beam direction management unit 314, determines a search area for performing beam training based on direction change information provided from the direction sensor 330 and beam index information of a transmitting and receiving beam direction used when previously communicating with a system device 350 and performs beam training only in the determined search area, thereby controlling and processing a function of determining a transmitting and receiving beam direction. Further, when a direction change of the probe device 300 is detected by the direction sensor 330, the controller 310 transmits a signal that requests to perform reduced beamforming to the system device 350 and receives a response signal thereto, thereby controlling and processing a function of performing reduced beamforming. Here, reduced beamforming is to perform beam training in only a transmitting and receiving beam corresponding to a limited area, such as a search area instead of performing beam training in an entire transmitting and receiving beam direction that can form through an antenna of the probe device 300. Additionally, the controller 310 determines whether communication with the system device 350 is performed in a selected transmitting and receiving beam direction through reduced beamforming, and if communication with the system device 350 cannot be performed in the selected transmitting and receiving beam direction, the controller 310 performs beam training in an entire transmitting and receiving beam direction that can form through the antenna of the probe device 300, thereby reselecting a transmitting and receiving beam. The controller 310 controls a beamforming module 322 to perform a known beam training method and selects an optimal beam based on a beam training result. For example, the controller 310 selects an optimal beam through beam training based on Sector level Sweep (SLS) defined to IEEE 802.11ad standard or a beam training method based on a Beam Refinement Protocol (BRP).

The electrical beam direction management unit 312 determines a beamforming area representing a search area in which beam training is to be performed based on direction information of a transmitting and receiving beam previously communicated with the system device 350 and present direction information (or changed direction information) of the probe device 300 and provides information about the determined beamforming area to the beamforming module 322 of the transceiver 320. In more detail, the electrical beam direction management unit 312 manages beam indexes representing beam directions that can form in the probe device 300 and store beam index information of an optimal transmitting and receiving beam direction used for communication with the system device 350. When information representing present direction information of the probe device 300 or the antenna is received from the physical beam direction management unit 314, the electrical beam direction management unit 312 determines a beam index representing an optimal transmitting and receiving beam direction communicated before a direction change of the probe device and determine a search area in which beam training is to be performed based on the determined beam index and present direction information of the probe device or each antenna. For example, the electrical beam direction management unit 312 controls to determine an area of a direction adjacent to a transmitting and receiving beam direction previously communicated with the system device 350 as a search area based on the determined beam index and present direction information or controls to determine an area including a direction of a transmitting and receiving beam previously communicated with the system device 350 and a direction adjacent thereto as a search area.

Further, the electrical beam direction management unit 312 generates beamforming area information representing the determined search area, provides the generated beamforming area information to the transceiver 320, and forms a transmitting and receiving beam only in a search area through the beamforming module 322, thereby controlling to perform beam training. Further, the electrical beam direction management unit 312 controls a function of transmitting beamforming area information and direction change information to the system device 350 through the transceiver 320. Here, the beamforming area information includes at least one of antenna information (such as an antenna index) to be used for beam training, an Antenna Weight Vector (AWV) (or an antenna pattern) for forming a transmitting and receiving beam in a search area, and sector information or the sector number representing a search area.

The physical beam direction management unit 314 manages a present direction of each antenna and/or direction information of the probe device. When receiving direction change information from the direction sensor 330, the physical beam direction management unit 314 calculates a direction of each antenna or direction information of the probe device after a direction change based on received direction change information and a direction of each antenna or direction information of the probe device before a direction change. The physical beam direction management unit 314 provides the calculated direction information, such as present direction information to the electrical beam direction management unit 312.

The direction sensor 330 is a sensor that detects a direction change like a gyro sensor, detects a direction change of each antenna or a direction of the probe device changed by a motion or movement of the probe device, and provides the detected direction change information to the physical beam direction management unit 314 included in the controller 310.

The transceiver 320 transmits and receives a signal through a plurality of antennas according to the control of the controller 310. The transceiver 320 includes the beamforming module 322, and the transceiver 320 includes a plurality of encoders, a plurality of modulators, a plurality of subcarrier mappers, a plurality of modulators, and a plurality of RF transmitters. The beamforming module 322 forms a beam for transmitting and receiving a signal to and from the system device 350 based on beamforming area information provided from the controller 310. The beamforming module 322 provides a beam index corresponding to a selected beam direction to the electrical beam direction management unit 312 according to the control of the electrical beam direction management unit 312. Here, the beamforming module 322 forms a transmitting and receiving beam requested from the controller 310 using at least one of digital beamforming, beamforming physically moving an antenna, and antennas, antenna bundles or antenna arrays corresponding to previously defined each beam direction.

Further, the system device 350 includes a controller 360 and a transceiver 370.

The controller 360 of the system device 350 performs a control function for general operations of the system device 350. For example, the controller 360 performs a function of outputting a signal received from the probe device 300 to an image, receive a signal that requests to perform reduced beamforming from the probe device 300 according to this disclosure, and controls and processes a function of transmitting a response signal thereto.

The controller 360 of the system device 350 includes an electrical beam direction management unit 362, and when a reduced beamforming perform request signal is received from the probe device 300, the controller 360 determines a search area for performing reduced beamforming with the probe device 300. That is, the electrical beam direction management unit 362 determines a search area for performing beam training based on beam index information of a direction of a transmitting and receiving beam used when previously communicating with the probe device 300 and direction change information and search area information of the probe device 300 received from the probe device 300. The electrical beam direction management unit 362 performs beam training in only the determined search area, thereby controlling and processing a function of determining a transmitting and receiving beam direction. Further, the electrical beam direction management unit 362 generates beamforming area information representing the determined search area, provides the generated beamforming area information to the transceiver 370, and form a transmitting and receiving beam in only a search area through a beamforming module 372, thereby controlling to perform beam training. Further, the electrical beam direction management unit 362 controls a function of transmitting beamforming area information to the probe device 300 through the transceiver 370. Here, the beamforming area information includes at least one of antenna information (such as an antenna index) to be used for beam training, an Antenna Weight Vector (AWV) (or an antenna pattern) for forming a transmitting and receiving beam in a search area, and the sector number or sector information representing a search area. The controller 360 of the system device 350 controls the beamforming module 372 to perform a known beam training method and select an optimal beam based on a beam training result. For example, the controller 360 selects an optimal beam through beam training based on Sector level Sweep (SLS) defined to IEEE 802.11ad standard or a beam training method based on a Beam Refinement Protocol (BRP).

The transceiver 370 of the system device 350 transmits and receives a signal through a plurality of antennas according to the control of the controller 360. The transceiver 370 includes the beamforming module 372, and the transceiver 370 includes a plurality of encoders, a plurality of modulators, a plurality of subcarrier mappers, a plurality of modulators, and a plurality of RF transmitters. The beamforming module 372 forms a beam for transmitting and receiving a signal to and from the probe device based on beamforming area information provided from the controller 360. Here, the beamforming module 372 forms a transmitting and receiving beam requested from the controller 360 using at least one of digital beamforming, beamforming physically moving an antenna, and antennas, and antenna bundles, or antenna arrays corresponding to previously defined each beam direction.

In the foregoing description, a description on a detailed function and configuration necessary for an ultrasonic wave signal processing in the probe device 300 and the system device 350 has been omitted, but a function and configuration related to an ultrasonic wave signal processing follows technology known to a person of ordinary skill in the art.

Further, in the foregoing description, as the system device 350 is fixed, a case in which a direction of the system device 350 is not changed has been described, but when the system device 350 can be moved, the system device 350 is configured, as in the probe device 300 to determine a search area based on direction change information and a beam index representing a previous transmitting and receiving beam direction.

Figure 4:
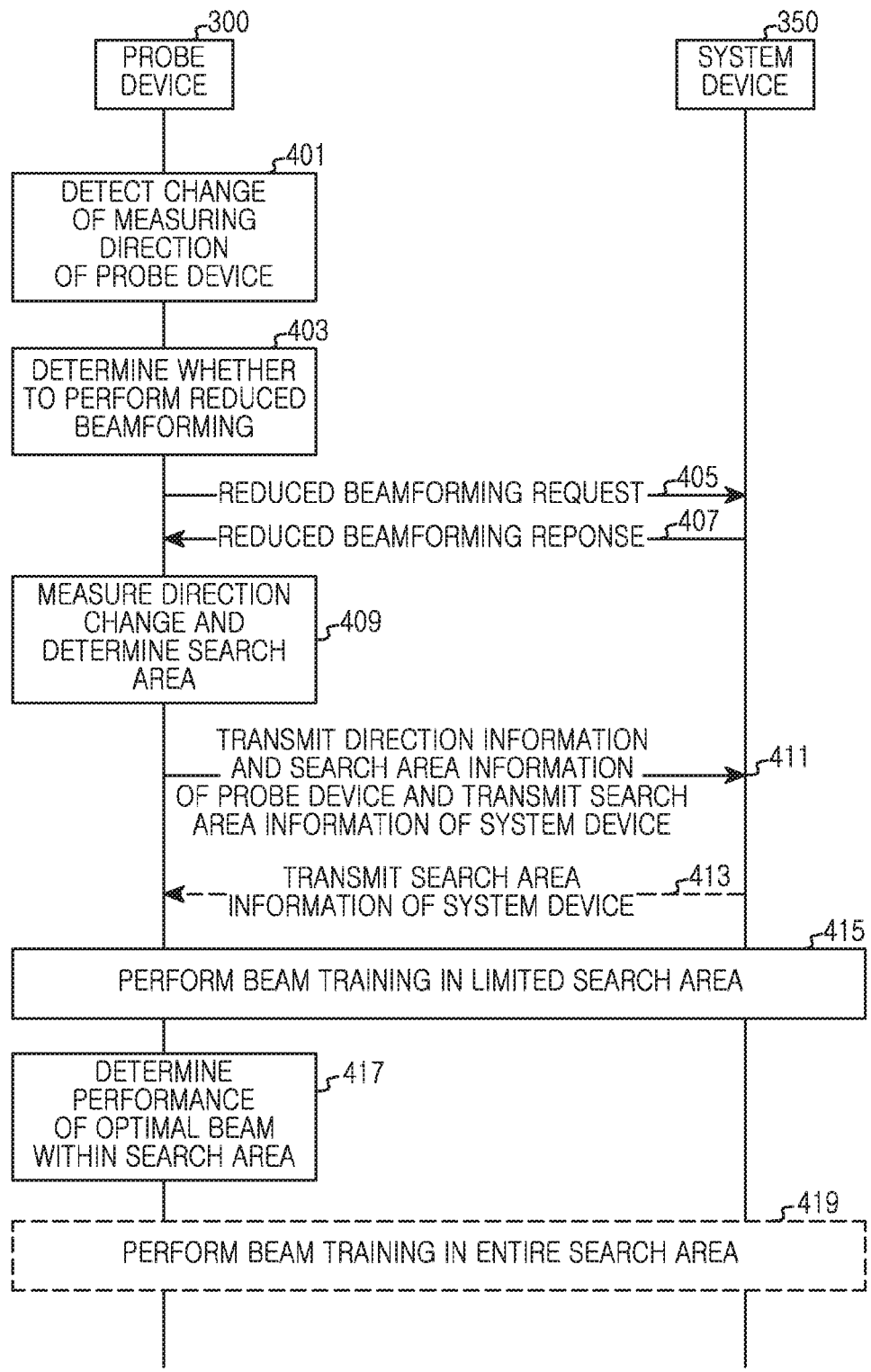
FIG. 4 is a message flow diagram illustrating an example signal flow for reduced beamforming in a wireless communication system according to this disclosure.

FIG. 4 is a message flow diagram illustrating an example signal flow for reduced beamforming in a wireless communication system according to this disclosure.

Referring to FIG. 4, the probe device 300 detects a change of a measuring direction thereof through the direction sensor 330 (401). For example, the probe device 300 detects a direction change of the probe device or the antenna due to a movement and motion of the probe device by a user control while measuring an ultrasonic wave of a target.

The probe device 300 determines whether to perform reduced beamforming (403). For example, the probe device 300 compares a direction change angle and a preset threshold value and measure a communication performance with the system device 350, thereby determining whether to perform reduced beamforming. For example, even if a direction of the probe device 300 is changed, if a direction change angle is smaller than or equal to a preset threshold angle and if a signal reception intensity value from the system device 350 is greater than or equal to a threshold value, the probe device 300 can determine not to perform reduced beamforming. If a direction change angle is greater than a preset threshold angle, the probe device 300 determines to perform reduced beamforming. Further, even if a direction change angle is equal to or smaller than a preset threshold angle, after a direction change, if a signal reception intensity value from the system device 350 is smaller than a threshold value, the probe device 300 determines to perform reduced beamforming. Hereinafter, a case determined to perform reduced beamforming will be described.

Figure 5A:
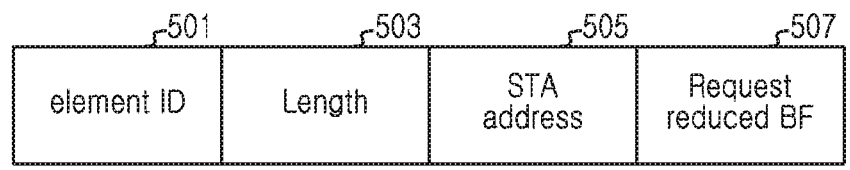

When it is determined to perform reduced beamforming, the probe device 300 transmits a reduced beamforming request signal to the system device 350 (405). Here, as illustrated in FIG. 5A, the reduced beamforming request signal includes element ID 501 representing that a corresponding message is a beamforming request message, a length 503 of a corresponding message, address information 505 of the probe device, and information 507 representing that a corresponding message is a reduced beamforming request message.

The system device 350 receives a reduced beamforming request signal from the probe device 300, recognizes that reduced beamforming with the probe device 300 should be performed, and transmits a reduced beamforming response signal (407).

The probe device 300 measures information representing a direction change of the probe device 300 using the direction sensor 330 and determines a search area (409). For example, the probe device 300 measures and generates a change amount of azimuth and elevation of the probe device 300 or the antenna, present azimuth and elevation of the probe device 300 or the antenna, or direction information representing a moving amount of the probe device 300 or the antenna based on an x-axis, a y-axis, and a z-axis by a direction change of the probe device 300 detected at step 401. As illustrated in FIG. 5B, direction information of the probe device 300 includes element ID 511 representing that corresponding information is direction information of the probe device, a length 513 of direction information, azimuth offset 515, elevation offset 517, x-axis distance offset 519, y-axis distance offset 521, and z-axis distance offset 523. Here, the offset is a difference value between corresponding parameter values at a time point before a direction change and a time point after a direction change. For example, the azimuth offset 515 is a difference value between azimuth of the probe device at a time point before a direction change and azimuth of the probe device at a time point after a direction change. Further, the probe device 300 determines a search area for performing beam training based on direction change information provided from the direction sensor 330 and beam index information of a transmitting and receiving beam direction used when previously communicating with the system device 350 and generate search area information (or referred to as 'beamforming area information') representing the determined search area. As illustrated in FIG. 5C, search area information of the probe device 300 includes element ID 531 representing that corresponding information is search area information of reduced beamforming, a length 533 of search area information, the antenna number 535, and indexes 537, 539, and 541 of antennas of a sector to perform beam training.

The probe device 300 transmits direction information and search area information thereof to the system device 350 and requests to transmit search area information of the system device 350 (411). Thereafter, the system device 350 determines a search area for performing reduction beam training based on the search area information received from the probe device 300 and beam index information of a transmitting and receiving beam direction used when previously communicating with the probe device 300 in the system device 350. The system device 350 transmits the determined search area information of the system device to the probe device 300 (413). Here, the probe device 300 adjusts a search area thereof based on the search area information of the system device 350.

Thereafter, the probe device 300 and the system device 350 perform beam training only in a limited search area (415). That is, the probe device 300 and the system device 350 performs beam training for only a transmitting and receiving beam corresponding to a limited search area instead of performing beam training in an entire transmitting and receiving beam direction that forms through respective antennas.

Thereafter, the probe device 300 determines a performance of a beam having a best signal transmitting and receiving performance among transmitting and receiving beams corresponding to the limited search area (417). For example, the probe device 300 selects a transmitting and receiving beam that receives a signal from the system device 350 with largest intensity among transmitting and receiving beams corresponding to a search area and compare received signal intensity of the selected transmitting and receiving beam and threshold signal intensity.

If received signal intensity of the selected transmitting and receiving beam is greater than or equal to threshold signal intensity, the probe device 300 determines that the selected transmitting and receiving beam satisfies a reference performance and determines to communicate with the system device 350 through the selected transmitting and receiving beam. If received signal intensity of the selected transmitting and receiving beam is smaller than threshold signal intensity, the probe device 300 determines that the selected transmitting and receiving beam does not satisfy a reference performance and determines to perform again a beamforming procedure.

If the selected transmitting and receiving beam does not satisfy a reference performance, the probe device 300 and the system device 350 performs beam training in an entire transmitting and receiving beam direction that forms through respective antennas, such as an entire search area (419) and reselects a transmitting and receiving beam to be used for communication with the system device 350.

Figure 6:
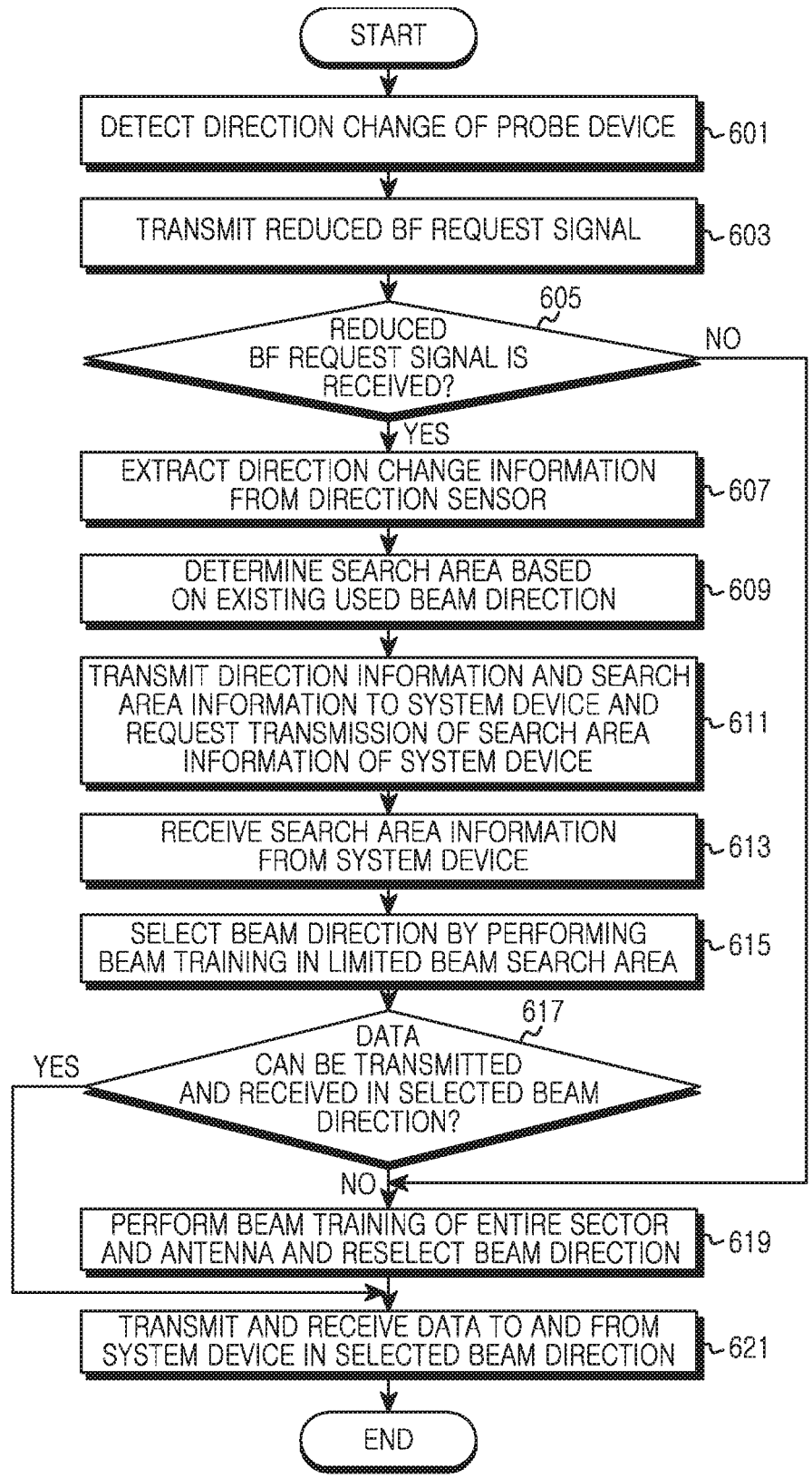
FIG. 6 is a flowchart illustrating an example beamforming procedure of a probe device in a wireless communication system according to this disclosure.

FIG. 6 is a flowchart illustrating an example beamforming procedure of a probe device in a wireless communication system according to this disclosure.

Referring to FIG. 6, the probe device 300 detects a change of a measuring direction thereof through the direction sensor 330 (601). For example, while measuring an ultrasonic wave of a target, the probe device 300 detects a direction change of the probe device or an antenna due to a movement and motion of the probe device by a user control.

The probe device 300 transmits a reduced beamforming request signal to the system device 350 (603). Here, as illustrated in FIG. 5A, the reduced beamforming request signal may include element ID 501 representing that a corresponding message is a beamforming request message, a length 503 of a corresponding message, address information 505 of the probe device, and information 507 representing that a corresponding message is a reduced beamforming request message. Here, the probe device 300 compares a direction change angle of the probe device 300 and a preset threshold value before transmitting a reduced beamforming request signal to the system device 350 and measures a communication performance with the system device 350 in a state in which a direction is changed, thereby determining whether to perform reduced beamforming.

The probe device 300 determines whether a reduced beamforming response message is received from the system device 350 (605). If a reduced beamforming response message is not received from the system device 350, the probe device 300 determines that reduced beamforming cannot be performed and the process continues at step 619. If a reduced beamforming response message is received from the system device 350, the probe device 300 determines that reduced beamforming can be performed and extracts direction change information from the direction sensor (607).

Thereafter, the probe device 300 determines a search area for performing beam training based on the extracted direction change information and beam index information of a transmitting and receiving beam direction used when previously communicating with the system device 350 (609). For example, the probe device 300 determines an area adjacent to a transmitting and receiving beam direction previously communicated with the system device 350 based on a previously used beam index, direction change information, and present direction information as a search area or determines an area including an area corresponding to a transmitting and receiving beam direction previously communicated with the system device 350 and a peripheral area thereof as a search area.

The probe device 300 transmits direction information and search area information to the system device 350 and requests transmission of search area information to the system device 350 (611). For example, the probe device 300 generates information including an azimuth change level of the antenna or the probe device 300, an elevation change level, an x-axis moving distance, a y-axis moving distance, and a z-axis moving distance by a direction change of the probe device 300. That is, as illustrated in FIG. 5B, direction information of the probe device 300 includes element ID 511 representing that corresponding information is direction information of the probe device, a length 513 of direction information, azimuth offset 515, elevation offset 517, x-axis distance offset 519, y-axis distance offset 521, and z-axis distance offset 523. Further, the probe device 300 generates search area information (or referred to as 'beamforming area information') representing a determined search area. As illustrated in FIG. 5C, search area information of the probe device 300 may include element ID 531 representing that corresponding information is search area information of reduced beamforming, a length 533 of search area information, the antenna number 535, and indexes 537, 539, and 541 of antennas of a sector to perform beam training.

The probe device 300 receives search area information from the system device 350 (613). Here, the probe device 300 adjusts a search area thereof based on search area information of the system device 350. For example, the probe device 300 adjusts a search area thereof to perform beam training in the same area as or an area adjacent to an area in which the system device 350 searches for.

Thereafter, by performing beam training in a limited beam search area, the probe device 300 selects a specific transmitting and receiving beam direction (615). For example, the probe device 300 performs beam training only in transmitting and receiving beam directions formed by a sector, an antenna, and a weight vector corresponding to a limited search area instead of performing beam training in an entire transmitting and receiving beam direction that can form through a plurality of antennas. The probe device 300 selects a transmitting and receiving beam direction having an optimal performance among transmitting and receiving beam directions corresponding to a search area based on a beam training result.

Thereafter, the probe device 300 determines whether data can be transmitted and received in the selected transmitting and receiving beam direction (617). For example, when receiving a signal through the selected transmitting and receiving beam, the probe device 300 determines whether intensity of the received signal is greater than or equal to threshold signal intensity. When received signal intensity of the selected transmitting and receiving beam is greater than or equal to threshold signal intensity, the probe device 300 determines that data can be transmitted and received through the selected transmitting and receiving beam, and if received signal intensity of the selected transmitting and receiving beam is smaller than threshold signal intensity, the probe device 300 determines that data cannot be transmitted and received through the selected transmitting and receiving beam.

If data can be transmitted and received in the selected transmitting and receiving beam direction, the probe device 300 transmits and receives data to and from the system device 350 in the selected transmitting and receiving beam direction (621) and terminates a procedure according to an exemplary embodiment of the present disclosure.

If data cannot be transmitted and received in the selected transmitting and receiving beam direction, the probe device 300 performs beam training of an entire sector and antenna and reselects a transmitting and receiving beam direction based on a beam training perform result (619).

Thereafter, the probe device 300 transmits and receives data to and from the system device 350 in the selected transmitting and receiving beam direction (621), and terminates a procedure according to an exemplary embodiment of the present disclosure.

Figure 7:
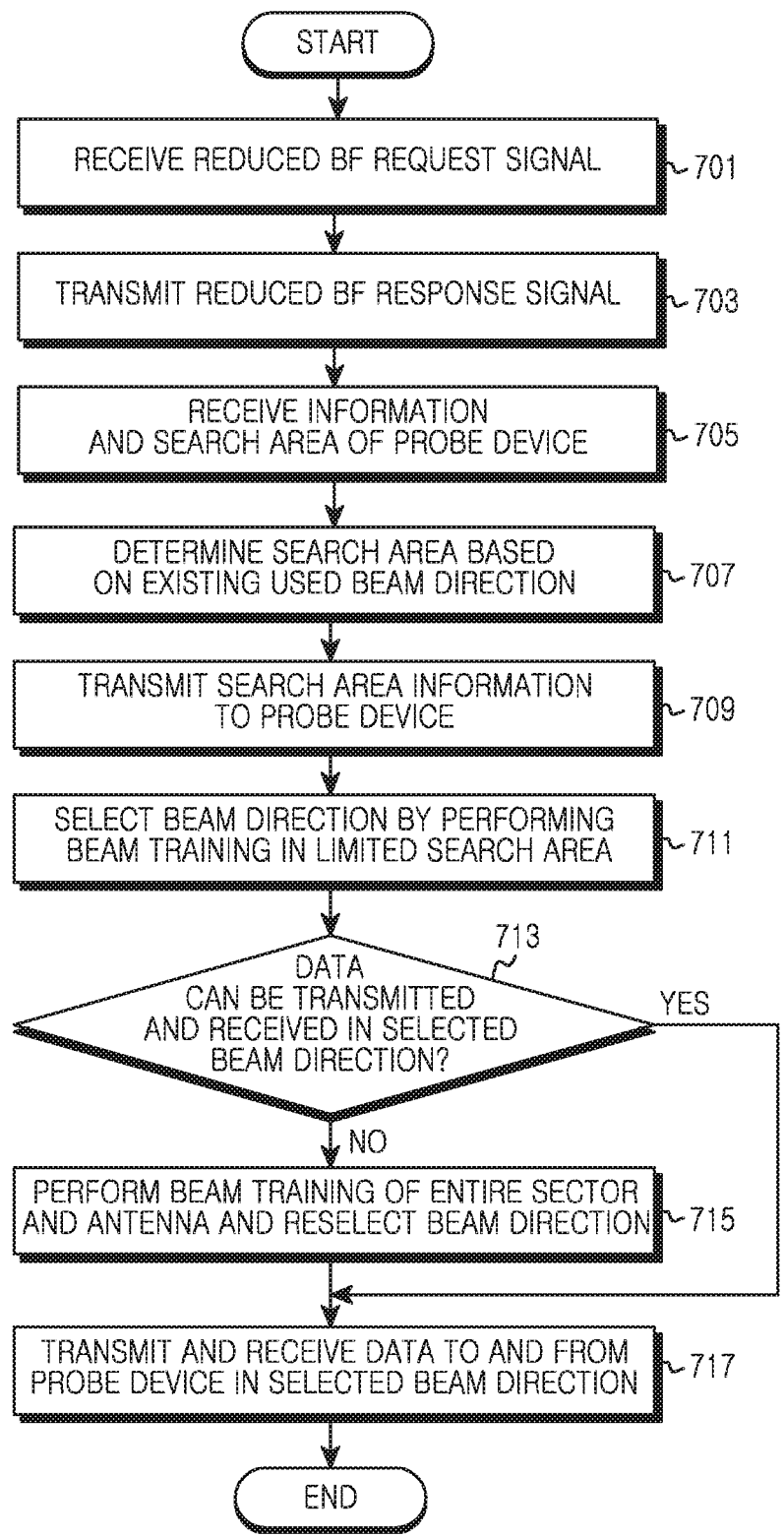
FIG. 7 is a flowchart illustrating an example beamforming procedure of a system in a wireless communication system according to this disclosure.

FIG. 7 is a flowchart illustrating an example beamforming procedure of a system in a wireless communication system according to this disclosure.

Referring to FIG. 7, the system device 350 receives a reduced beamforming request signal from the probe device 300 (701). Here, as illustrated in FIG. 5A, the reduced beamforming request signal includes element ID 501 representing that a corresponding message is a beamforming request message, a length 503 of a corresponding message, address information 505 of the probe device 300, having transmitted a corresponding message, and information 507 representing that a corresponding message is a reduced beamforming request message.

The system device 350 recognizes that reduced beamforming of the probe device 300 is performed and transmits a reduced beamforming response signal (703).

Thereafter, the system device 350 receives information representing direction information and a search area of the probe device 300 (705). Here, direction information of the probe device 300 is configured, as illustrated in FIG. 5B, and search area information of the probe device 300 is configured, as illustrated in FIG. 5C.

The system device 350 determines a search area for performing reduction beam training based on beam index information of a transmitting and receiving beam direction used when previously communicating with the probe device 300 and direction information and search area information received from the probe device 300 (707).

The system device 350 transmits the determined search area information of the system device 350 to the probe device 300 (709). Here, the search area information is configured, as illustrated in FIG. 5C.

Thereafter, by performing beam training only in a limited search area, the system device 350 selects a specific transmitting and receiving beam direction (711). For example, the system device 350 performs beam training only in transmitting and receiving beam directions formed by a sector, an antenna, and a weight vector corresponding to a limited search area instead of performing beam training in an entire transmitting and receiving beam direction that forms through a plurality of antennas. The system device 300 selects a transmitting and receiving beam direction having an optimal performance among transmitting and receiving beam directions corresponding to a search area based on a beam training result.

Thereafter, the system device 350 determines whether data can be transmitted and received in the selected transmitting and receiving beam direction (713). For example, when receiving a signal through the selected transmitting and receiving beam signal, the system device 350 determines whether received signal intensity is greater than or equal to threshold signal intensity. If received signal intensity of the selected transmitting and receiving beam is greater than or equal to threshold signal intensity, the system device 350 determines that data can be transmitted and received through the selected transmitting and receiving beam, and if received signal intensity of the selected transmitting and receiving beam is smaller than threshold signal intensity, the system device 350 determines that data cannot be transmitted and received through the selected transmitting and receiving beam.

If data can be transmitted and received in the selected transmitting and receiving beam direction, the system device 350 transmits and receives data to and from the probe device 300 in the selected transmitting and receiving beam direction (717) and terminates a procedure according to this disclosure.

If data cannot be transmitted and received in the selected transmitting and receiving beam direction, the system device 350 performs beam training of an entire sector and antenna and reselects a transmitting and receiving beam direction based on a beam training result (715).

Thereafter, the system device 350 transmits and receives data to and from the probe device 300 in the selected transmitting and receiving beam direction (717) and terminates a procedure according to an exemplary embodiment of the present disclosure.

Figure 8:
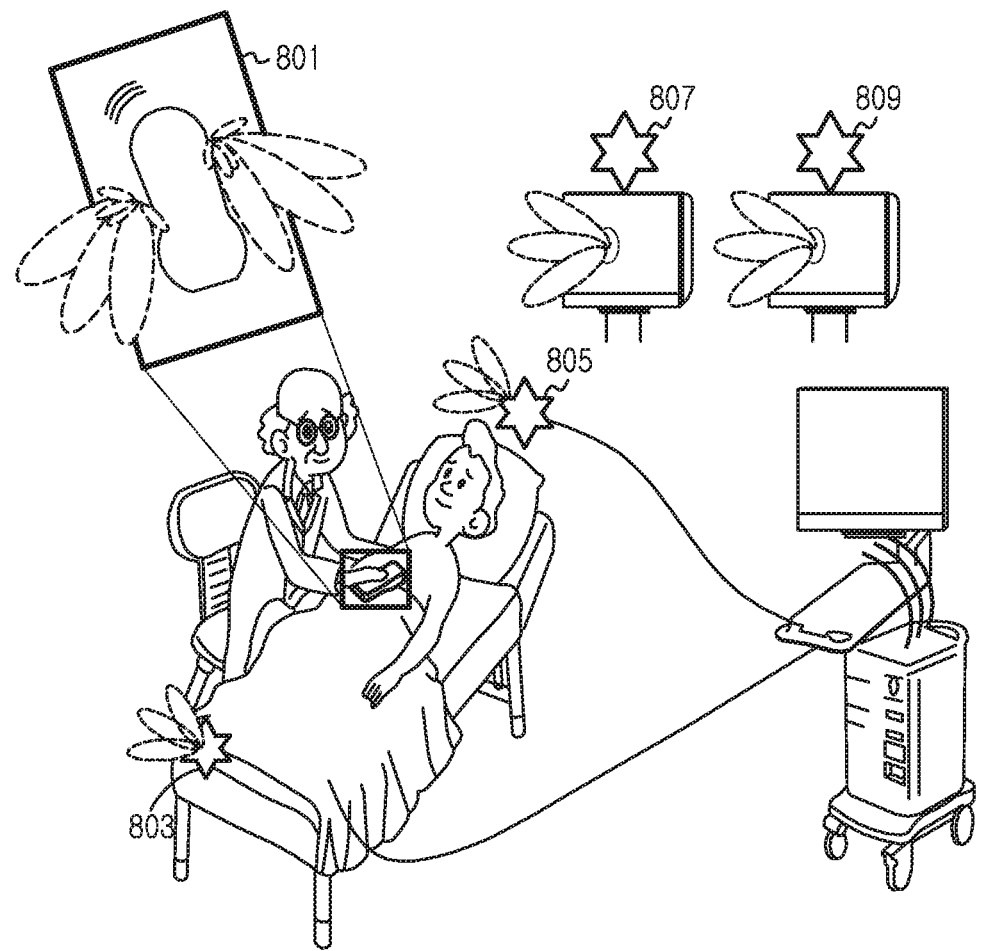
FIG. 8 is a diagram illustrating an example structure of a wireless ultrasonic wave system according to this disclosure.

FIG. 8 is a diagram illustrating an example structure of a wireless ultrasonic wave system according to this disclosure.

As described above, as illustrated in FIG. 8, an exemplary embodiment of the present disclosure can be applied to various system structures. For example, the foregoing exemplary embodiment can be applied to a system structure including a probe device 801 having a plurality of array antennas. For another example, the foregoing exemplary embodiment can be applied to a system structure including a plurality of sinks 803 and 805 connected to a system device by wire. Here, the sink includes at least one array antenna device that receives a signal from the probe device 801. For another example, the foregoing exemplary embodiment can be applied to a system structure in which a plurality of sinks 807 and 809 are disposed to perform a wireless repeater function.

Figure 9:
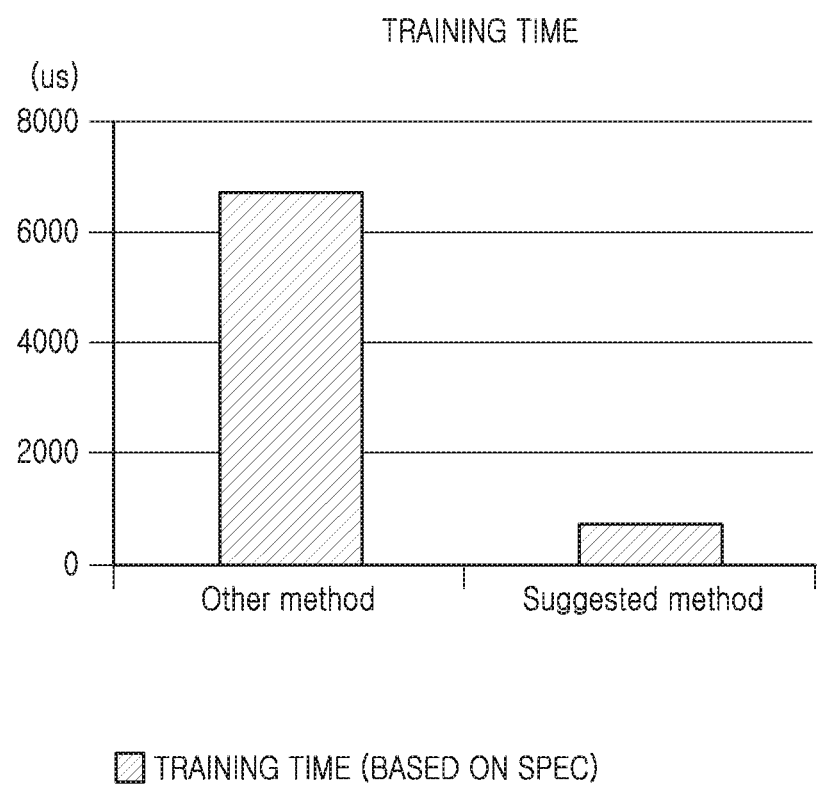
FIG. 9 is a graph illustrating an examples of beam training times according to this disclosure.

FIG. 9 is a graph illustrating an example beam training time in another art and a beam training time according to this disclosure. Here, a beam training time represents an experiment result of a case in which transmitting diversity is 4 and in which receiving diversity is 4 and in which the sector number of each antenna is 20 and in which the number of sectors included in a search area in which reduced beamforming is performed is 10.

Referring to FIG. 9, in the other art, when a direction of the probe device is changed, by performing beam training in an entire direction, if a transmitting and receiving beam is selected, a time of 6000 μs or more may be consumed for beam training. However, when a direction of the probe device is changed, by performing beam training in a limited search area, if a transmitting and receiving beam is selected, a time within 1000 μs is consumed for beam training. That is, when performing beam training in a limited search area based on a direction change of the probe device, a time consumed for beam training can be greatly reduced.

A case of performing electrical beamforming in the probe device has been described, but when performing mechanical beamforming in a probe device, mechanical beamforming can be together performed while performing electrical beamforming. For example, in the probe device, when a direction of an antenna is adjusted through a mechanical device (such as a motor), while electrically controlling a beam direction, by mechanically adjusting a direction of the antenna, a transmitting and receiving beam direction is more minutely adjusted and set.

Hereinafter, in FIGS. 10 to 14, a case of performing mechanical beamforming together with electrical beamforming is provided. Hereinafter, electrical beamforming described with reference to FIGS. 10 to 14 includes both a known beamforming method and a reduced beamforming method suggested in the present disclosure.

Figure 10:
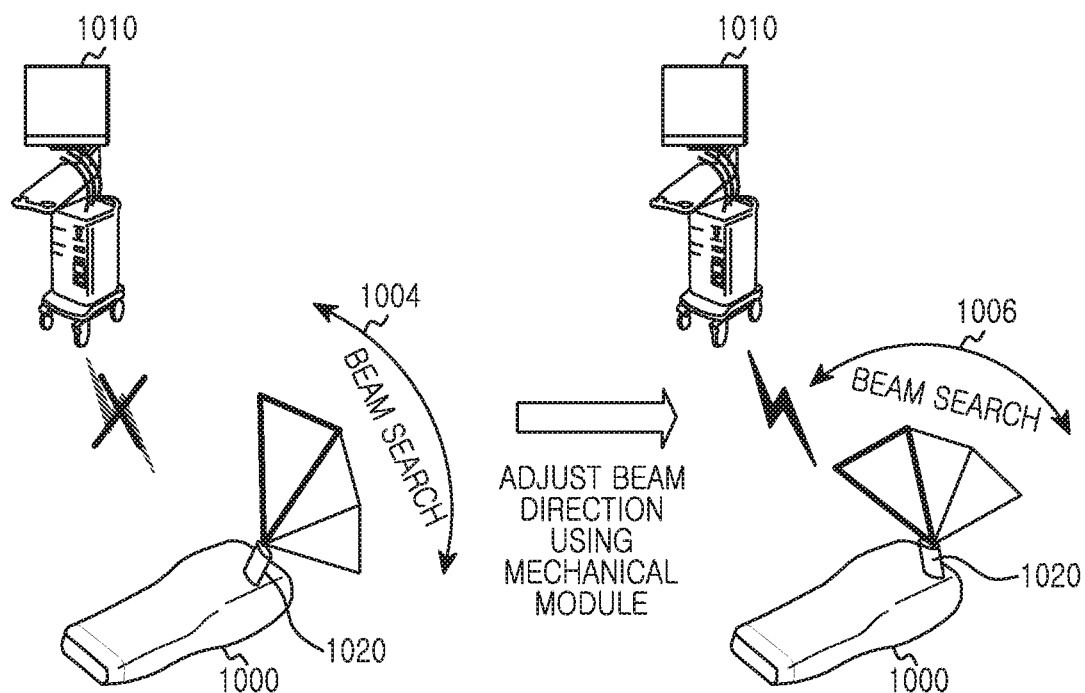
FIG. 10 is a diagram illustrating an example of performing mechanical beamforming based on an electrical beam training result in a probe device according to this disclosure.

FIG. 10 is a diagram illustrating an example of performing mechanical beamforming based on an electrical beam training result in a probe device according to this disclosure.

Referring to FIG. 10, a probe device 1000 includes at least one antenna and forms a transmitting and receiving beam in a specific direction through at least one antenna. Here, the antenna includes a beam antenna or an array antenna that forms a beam in a specific direction. Further, the probe device controls a mechanical module that connects each antenna, thereby adjusting a direction of a transmitting and receiving beam that can form in each antenna.

The probe device 1000 detects that a direction of the probe device 1000 is changed based on a signal transmitting and receiving result with a system device 1010. When a direction change is detected, the probe device 1000 performs beam training according to a beamforming protocol and control a mechanical module 1020 that adjusts a direction of an antenna based on a beam training result, thereby adjusting a transmitting and receiving beam direction 1004 of the antenna to a direction 1006 that transmits and receives a signal of the system device 1010.

Here, the number and a location of antennas of the probe device illustrated in FIG. 10 are an illustration, and the following description is not limited to a structure of FIG. 10 and can be applied to various structures. For example, the following description can be applied to a case in which the probe device includes a plurality of array antennas at a specific location or a case in which the probe device includes a plurality of array antennas at various locations.

Figure 11:
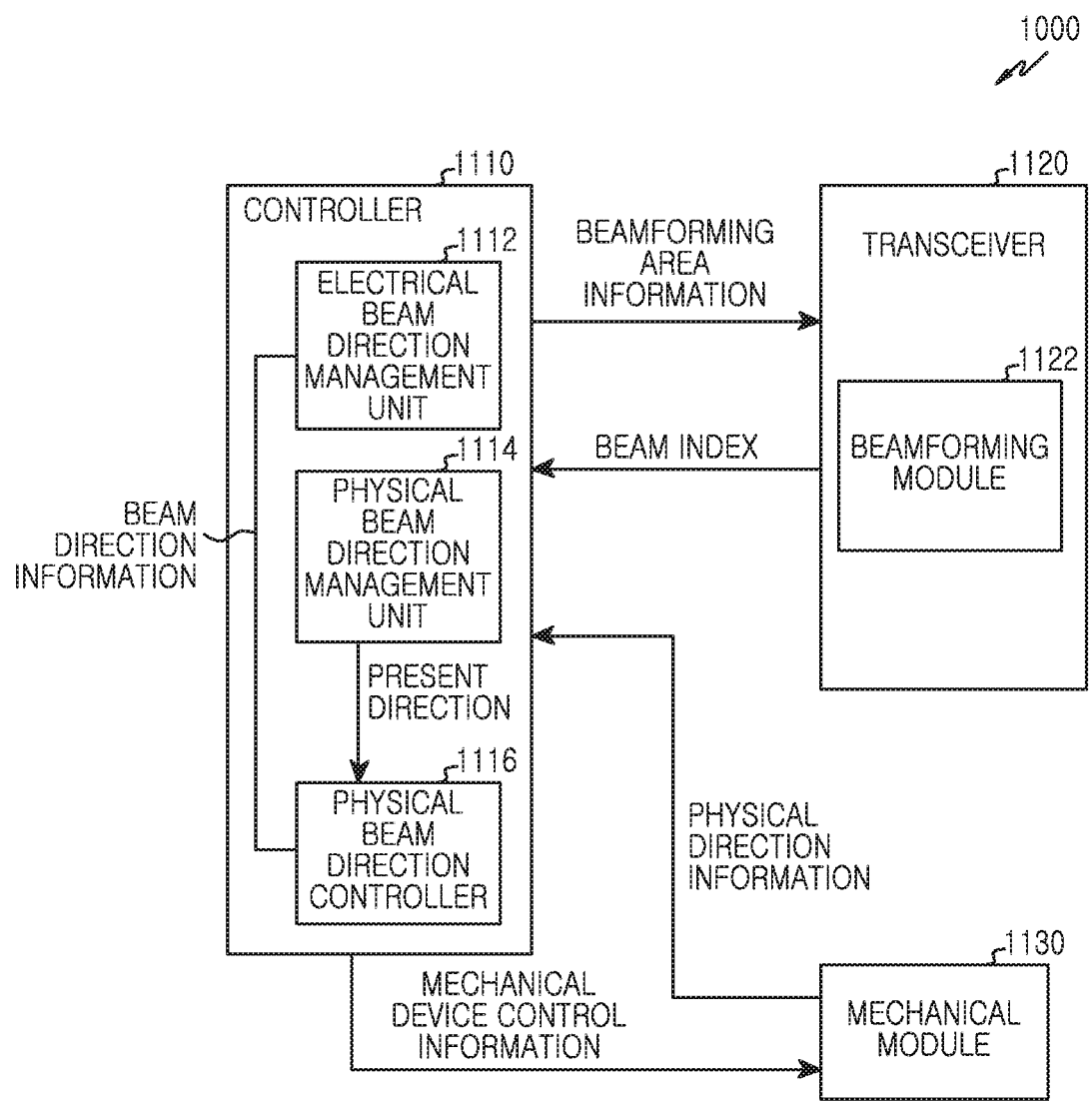
FIG. 11 is a block diagram illustrating an example configuration of a probe device according to this disclosure.

FIG. 11 is a block diagram illustrating an example configuration of a probe device according to this disclosure.

Referring to FIG. 11, the probe device 1000 includes a controller 1110, a transceiver 1120, and a mechanical module 1130.

The controller 1110 performs a control function for general operations of the probe device 1000. For example, the controller 1110 performs a function necessary for an ultrasonic wave signal processing, detect a direction change of the probe device 1000 according to an exemplary embodiment of the present disclosure, and controls and processes a function of performing beamforming, when a direction change is detected. For example, when a communication performance with the system device 1010 is deteriorated or when communication with the system device 1010 is failed, the controller 1110 detects that a direction of the probe device 1000 is changed.

The controller 1110 includes an electrical beam direction management unit 1112, a physical beam direction management unit 1114, and a physical beam direction controller 1116, and when a direction of the probe device 1000 is changed, the controller 1110 controls and processes a function of together performing electrical beamforming and physical beamforming. In order words, when a direction change of the probe device 1000 is detected, by adjusting the mechanical module 1130 based on a transmitting and receiving beam direction selected through beam training and beam index information of the selected transmitting and receiving beam direction, the controller 1110 controls to form an antenna transmitting and receiving beam in a direction having a high possibility in which a communication link with the system device 1010 is to be formed.

When a direction of the probe device 1000 is changed, the electrical beam direction management unit 1112 controls a beamforming module 1122 to perform beam training, selects an optimal transmitting and receiving beam direction based on a beam training result, and manages information of the selected transmitting and receiving beam direction. When a direction of the probe device 1000 is changed, in order to perform beamforming, the electrical beam direction management unit 1112 provides beamforming area information representing an area to perform beam training to the beamforming module 1122. According to an exemplary embodiment, the electrical beam direction management unit 1112 controls to perform beam training in an entire transmitting and receiving beam direction that forms through the antenna of the probe device 1000, and as in an exemplary embodiment of FIG. 3, the electrical beam direction management unit 1112 determines a search area based on a transmitting and receiving beam direction previously communicated with the system device 1010 and controls to perform beam training only in the determined search area. Here, the beamforming area information includes at least one of antenna information (such as an antenna index) to be used for beam training, an Antenna Weight Vector (AWV) (or an antenna pattern) for forming a transmitting and receiving beam in an area to perform beam training, and sector information or the sector number representing an area to perform beam training. Further, when a direction of the probe device 1000 is changed by the controller 1110, the electrical beam direction management unit 1112 provides a direction of a transmitting and receiving beam to the physical beam direction management unit 1114 before a direction change.

The physical beam direction management unit 1114 receives and manages physical direction change information or present physical direction information of the mechanical module 1130. When a direction of the probe device 1000 is changed, the physical beam direction management unit 1114 provides present direction information of the mechanical module 1130 to the physical beam direction controller 1116.

When a direction of the probe device 1000 is changed, the physical beam direction controller 1116 receives information about a selected transmitting and receiving beam direction from the electrical beam direction management unit 1112 and receives index information of a selected beam direction from the beamforming module 1122. Further, the physical beam direction controller 1116 receives present direction information of the mechanical module 1130 from the physical beam direction management unit 1114. The physical beam direction controller 1116 determines how much to rotate or move the mechanical module 1130 from a present direction to which direction based on the received transmitting and receiving beam direction and beam index information and generates mechanical device control information representing this. In order to form an antenna transmitting and receiving beam in a direction having a high possibility in which a communication link is to be formed by a direction change of the mechanical module 1130, the physical beam direction controller 1116 provides mechanical device control information to the mechanical module 1130.

The transceiver 1120 transmits and receives a signal through a plurality of antennas according to the control of the controller 1110. The transceiver 1120 includes a beamforming module 1122, and the transceiver 1120 includes a plurality of encoders, a plurality of modulators, a plurality of subcarrier mappers, a plurality of modulators, and a plurality of RF transmitters. The beamforming module 1122 forms a beam for transmitting and receiving a signal to and from the system device 1010 based on beamforming area information provided from the controller 1110. The beamforming module 1122 provides a beam index corresponding to a selected beam direction to the physical beam direction controller 1116 according to the control of the electrical beam direction management unit 1112. Here, the beamforming module 1122 forms a transmitting and receiving beam requested from the controller 1110 using at least one of digital beamforming and antennas, antenna bundles, or antenna arrays corresponding to previously defined each beam direction.

The mechanical module 1130 is a mechanical device that connects the antenna to the probe device 1000, and by performing an angle change or a distance movement based on control information provided from the physical beam direction controller 1116, the mechanical module 1130 adjusts a beam direction of the antenna. For example, the mechanical module 1130 includes a mechanical device such as a motor.

In the foregoing description, a description on a detailed function and a configuration necessary for an ultrasonic wave signal processing in the probe device 1000 and the system device 1010 has been omitted, but a function and a configuration related to an ultrasonic wave signal processing can follow technology known to a person of ordinary skill in the art.

Further, in the foregoing description, as the system device 1010 is fixed, a case in which a direction of the system device 1010 is not changed has been described, but when the system device 1010 can be moved, the system device 1010 is configured, as in the probe device 1000 and thus by together performing electrical beamforming and mechanical beamforming, the system device 1010 sets a transmitting and receiving beam to be used for communication with the probe device 1000.

Figure 12:
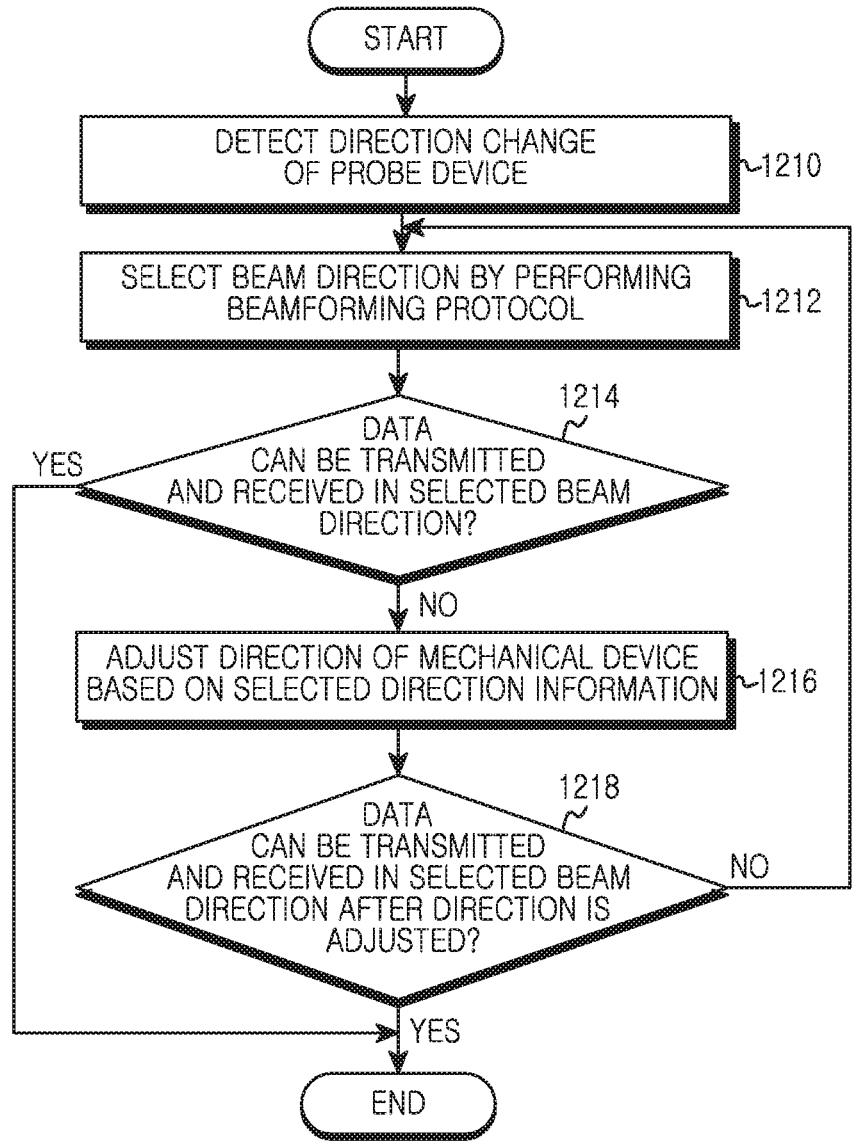
FIG. 12 is a flowchart illustrating an example beamforming procedure of a probe device in a wireless communication system according to this disclosure.

FIG. 12 is a flowchart illustrating an example beamforming procedure of a probe device in a wireless communication system according to this disclosure.

Referring to FIG. 12, the probe device 1000 detects a direction change thereof (1210). For example, when a communication performance with the system device 1010 is deteriorated or when communication with the system device 1010 is failed, the probe device 1000 detects a direction change thereof.

By performing a beamforming protocol, the probe device 1000 selects a beam direction (1212). For example, the probe device 1000 performs beam training in an entire transmitting and receiving beam direction that can form through an antenna thereof, and as in an exemplary embodiment of FIG. 3, the probe device 1000 determines a limited search area based on a transmitting and receiving beam direction previously communicated with the system device 1010 and perform beam training only in a limited search area. In this case, the probe device 1000 selects a beam direction in which a signal transmitting and receiving performance with the system device 1010 is best as a beam training result.

Thereafter, the probe device 1000 determines whether data can be transmitted and received to and from the system device 1010 in the selected beam direction (1214). For example, the probe device 1000 receives a signal from the system device 1010 in the selected beam direction, and by comparing signal reception intensity with a threshold value, the probe device 1000 determines whether data can be transmitted and received to and from the system device 1010 in the selected beam direction.

If data can be transmitted and received to and from the system device 1010 in the selected beam direction, the probe device 1000 terminates a beamforming procedure according to this disclosure.

If data cannot be transmitted and received to and from the system device 1010 in the selected beam direction, the probe device 1000 adjusts a direction of a mechanical device based on the selected beam direction (1216). For example, by adjusting an angle of a mechanical device based on the selected beam direction and beam index information of the selected beam direction, the probe device 1000 controls an antenna transmitting and receiving beam to be formed in a direction having a high possibility in which a communication link is to be formed.

Thereafter, the probe device 1000 determines whether data is transmitted and received in a selected beam direction after a direction of the mechanical device is adjusted (1218). For example, the probe device 1000 forms a transmitting and receiving beam with a beam index corresponding to the beam direction selected at step 1212, compares intensity of a signal received from the system device 1010 through the formed transmitting and receiving beam with a threshold value, and determines whether data can be transmitted and received. Here, by using the beam index selected at step 1212, the probe device 1000 forms a transmitting and receiving beam, as in step 1214, but because an angle of the mechanical device has been changed at step 1216, the transmitting and receiving beam direction at step 1214 and the transmitting and receiving beam direction at step 1218 can be different.

If data can be transmitted and received to and from the system device 1010 in a selected beam direction, the system device 1010 terminates a beamforming procedure according to another exemplary embodiment of the present disclosure. If data cannot be transmitted and received to and from the system device 1010 in a selected beam direction, by returning to step 1212, the process is performed again.

Figure 13:
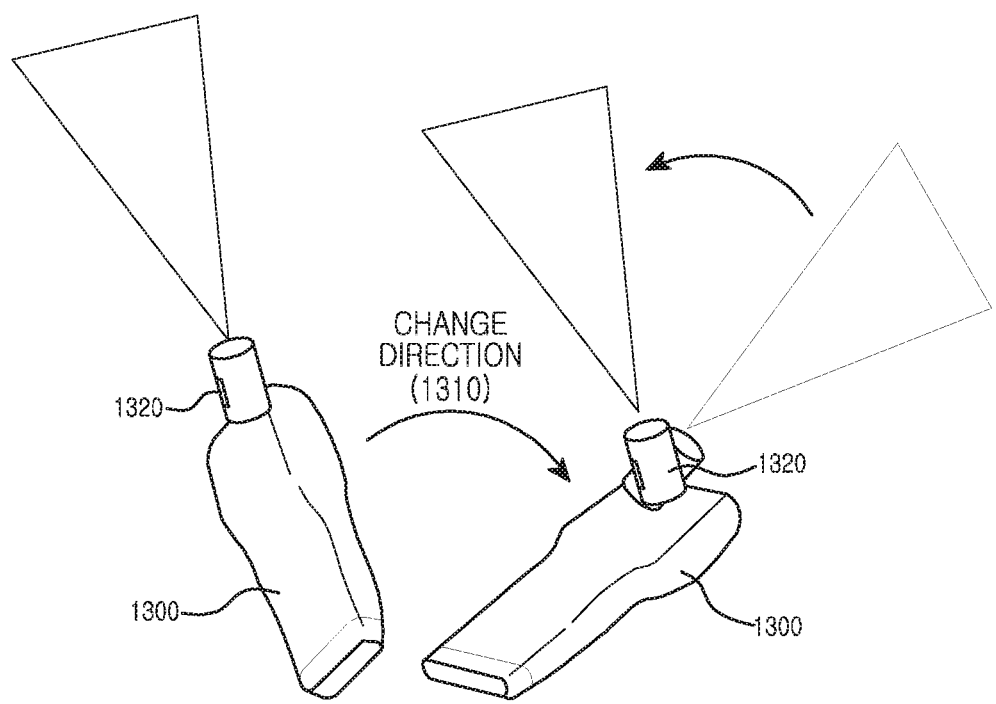
FIG. 13 is a diagram illustrating an example of performing mechanical beamforming based on direction change information detected by a direction sensor in a probe device according to this disclosure.

FIG. 13 is a diagram illustrating an example of performing mechanical beamforming based on direction change information detected by a direction sensor in a probe device according to this disclosure.

Referring to FIG. 13, the probe device 1300 includes at least one antenna and form a transmitting and receiving beam in a specific direction through at least one antenna. Here, the antenna includes a beam antenna or an array antenna that can form a beam in a specific direction. Further, the probe device controls a mechanical module 1320 that connects each antenna to adjust a direction of a transmitting and receiving beam that can form in each antenna.

The probe device 1300 detects that a direction of the probe device 1300 is changed (1310) by a direction sensor. When a direction change is detected, the probe device 1300 acquires direction information previously normally communicated with the system device from the direction sensor and controls the mechanical module 1320 to adjust a transmitting and receiving beam direction 1004 of the antenna to a direction previously normally communicated with the system device based on the acquired direction information.

Here, the number and a location of antennas of the probe device illustrated in FIG. 13 are an illustration, and the following description is not limited to a structure of FIG. 10 and can be applied to various structures. For example, the following description can be applied to a case in which the probe device includes a plurality of beam antennas at a specific location or a case in which the probe device includes a plurality of array antennas at various locations.

Figure 14:
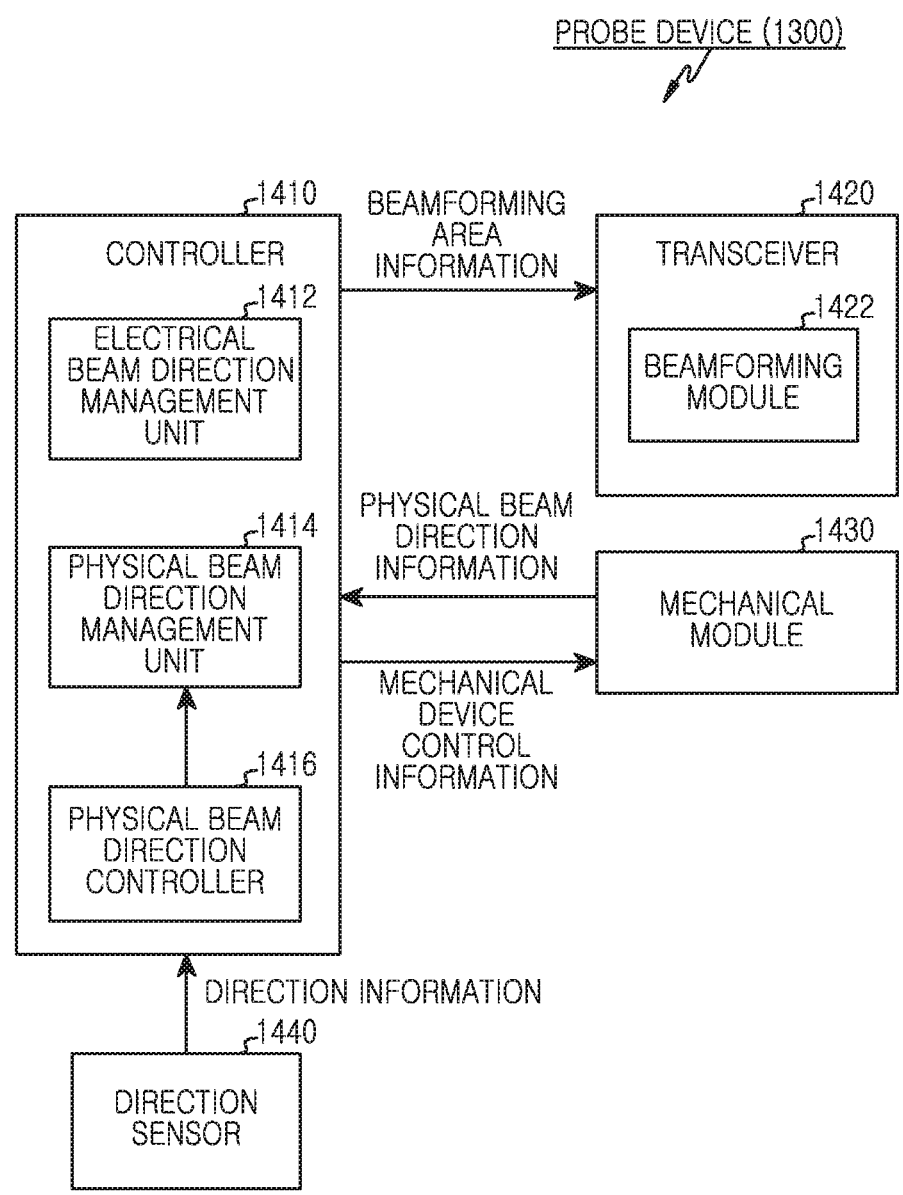
FIG. 14 is a block diagram illustrating an example configuration of a probe device according to this disclosure.

FIG. 14 is a block diagram illustrating an example configuration of a probe device according to this disclosure.

Referring to FIG. 14, a probe device 1300 includes a controller 1410, a transceiver 1420, a mechanical module 1430, and a direction sensor 1440.

The controller 1410 performs a control function for general operations of the probe device 1300. For example, the controller 1410 performs a function necessary for a processing of an ultrasonic wave signal, detects a direction change of the probe device 1300 according to an exemplary embodiment of the present disclosure, and controls and processes a function of performing beamforming, when a direction change is detected. For example, the controller 1410 detects a change of a direction based on direction information input from the direction sensor 1440.

The controller 1410 includes an electrical beam direction management unit 1412, a physical beam direction management unit 1414, and a physical beam direction controller 1416. By controlling a beamforming module 1422, the electrical beam direction management unit 1412 performs beam training, selects an optimal transmitting and receiving beam direction based on a beam training result, and manages information of the selected transmitting and receiving beam direction. In order to perform beamforming, the electrical beam direction management unit 1412 provides beamforming area information representing an area to perform beam training to the beamforming module 1422.

The physical beam direction management unit 1414 receives and manages physical direction change information or present physical direction information of the mechanical module 1430. When a direction of the probe device 1300 is changed, the physical beam direction management unit 1414 provides present direction information of the mechanical module 1430 to the physical beam direction controller 1416.

When a direction of the probe device 1300 is changed, the physical beam direction controller 1416 receives direction information, such as direction change information received from the direction sensor 1440 and receive present direction information of the mechanical module 1430 from the physical beam direction management unit 1414. The physical beam direction controller 1416 determines how much to rotate or move the mechanical module 1430 from a present direction to which direction based on the received direction change information and present direction information of the probe device 1300 and generates mechanical device control information representing this. In order to form an antenna transmitting and receiving beam in a direction having a high possibility in which a communication link is to be formed by a direction change of the mechanical module 1430, the physical beam direction controller 1416 provides mechanical device control information to the mechanical module 1430.

The transceiver 1420 transmits and receives a signal through a plurality of antennas according to the control of the controller 1410. The transceiver 1420 includes the beamforming module 1422, and although not described in the drawing, the transceiver 1420 includes a plurality of encoders, a plurality of modulators, a plurality of subcarrier mappers, a plurality of modulators, and a plurality of RF transmitters. The beamforming module 1422 forms a beam for transmitting and receiving a signal to and from a system device based on beamforming area information provided from the controller 1410. Here, the beamforming module 1422 forms a transmitting and receiving beam requested from the controller 1410 using at least one of digital beamforming and antennas, antenna bundles, or antenna arrays corresponding to previously defined each beam direction.

The mechanical module 1430 is a mechanical device that connects an antenna to the probe device 1300 and performs an angle change or a distance movement based on control information provided from the physical beam direction controller 1416, thereby adjusting a beam direction of the antenna. For example, the mechanical module 1430 includes a mechanical device such as a motor.

The direction sensor 1440 is a sensor that can detect a direction change, such as a gyro sensor and an acceleration sensor and detects a direction change of each antenna or a direction of the probe device changed by a movement or a motion of the probe device, and provides detected direction change information to the physical beam direction management unit 1414 included in the controller 1410.

In the foregoing description, a description on a detailed function and configuration necessary for an ultrasonic wave signal processing in the probe device 1300 and the system device has been omitted, but a function and a configuration related to an ultrasonic wave signal processing can follow technology known to a person of ordinary skill in the art.

Further, in the foregoing description, as a system device is fixed, a case in which a direction of the system device is not changed has been described, but when the system device can be moved, the system device can be configured, as in the probe device 1300 and thus by performing electrical beamforming and mechanical beamforming, a transmitting and receiving beam to be used for communication with the probe device 1300 may be set.

Figure 15:
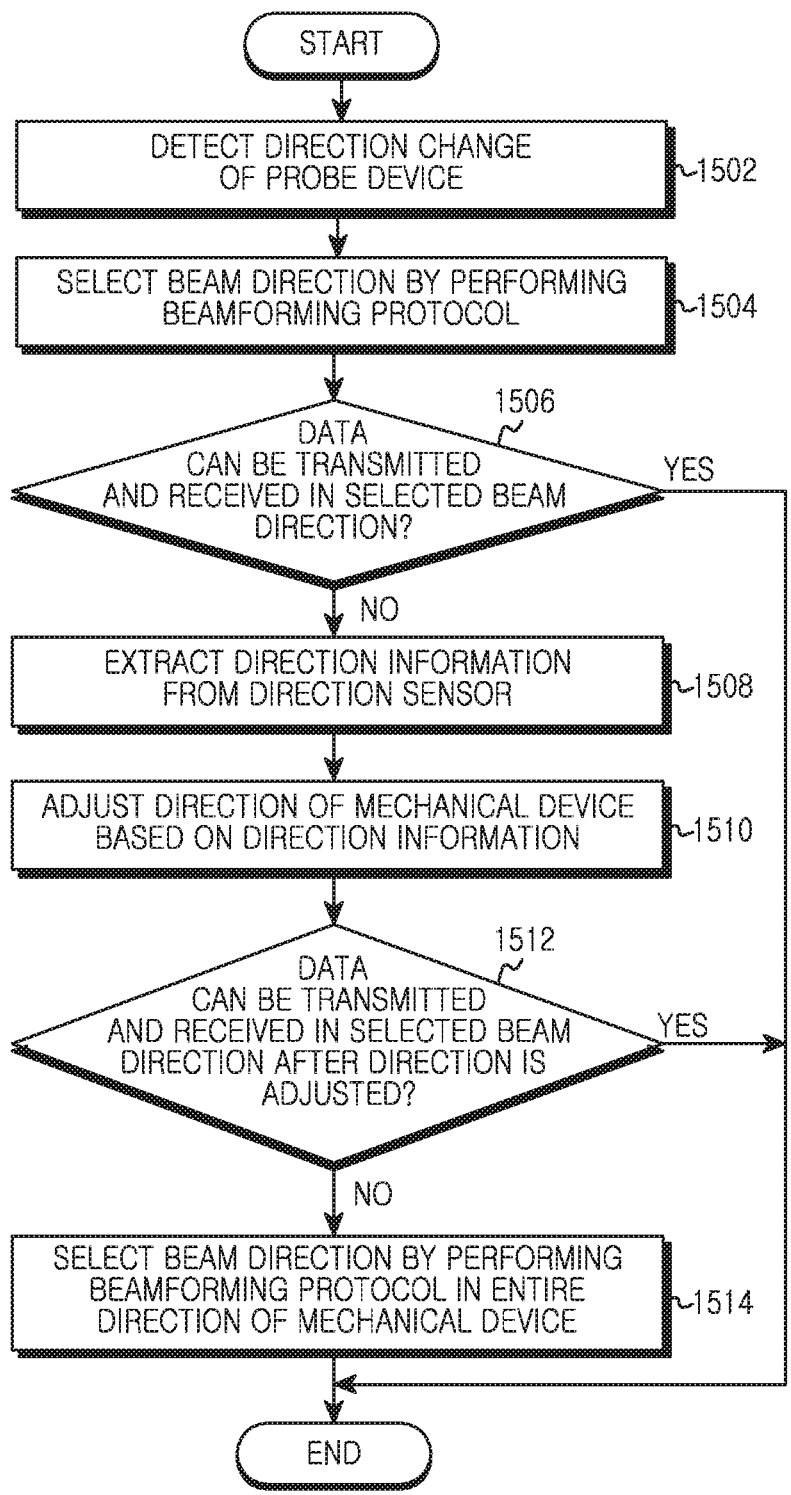
FIG. 15 is a flowchart illustrating a beamforming procedure of a probe device in a wireless communication system according to this disclosure.

FIG. 15 is a flowchart illustrating an example beamforming procedure of a probe device in a wireless communication system according to this disclosure.

Referring to FIG. 15, the probe device 1300 detects a direction change thereof (1502). For example, the probe device 1300 detects that a direction thereof is changed through the direction sensor 1440.

By performing a beamforming protocol, the probe device 1300 selects a beam direction (1504). For example, the probe device 1300 performs beam training in an entire transmitting and receiving beam direction that can form through an antenna thereof, and as in an exemplary embodiment of FIG. 3, the probe device 1300 determines a limited search area based on a transmitting and receiving beam direction previously communicated with a system device and performs beam training only in the limited search area. In this case, the probe device 1300 selects a beam direction in which a signal transmitting and receiving performance with the system device is best as a beam training result.

Thereafter, the probe device 1300 determines whether data can be transmitted and received to and from the system device in the selected beam direction (1506). For example, the probe device 1300 receives a signal from the system device in the selected beam direction, compares signal reception intensity with a threshold value, and determines whether data can be transmitted and received in the selected beam direction. If data can be transmitted and received in the selected beam direction, the probe device 1300 terminates a beamforming procedure according to this disclosure.

If data cannot be transmitted and received in the selected beam direction, the probe device 1300 extracts direction information from a direction sensor (1508). For example, the probe device 1300 extracts direction information including azimuth offset, elevation offset, x-axis distance offset, y-axis distance offset, and z-axis distance offset of a previous direction and a present direction of the probe device 1300 from the direction sensor. Thereafter, the probe device 1300 adjusts a direction of a mechanical device based on the extracted direction information and present direction information of the mechanical device (1510). For example, the probe device 1300 determines how much to rotate or move the mechanical device from a present direction to which direction based on direction change information of the probe device 1300 and present direction information of the mechanical device and adjust an angle or a location of the mechanical device based on this.

Thereafter, the probe device 1300 determines whether data can be transmitted and received in the selected beam direction after a direction of the mechanical device is adjusted (1512). For example, the probe device 1300 forms a transmitting and receiving beam with a beam index corresponding to the beam direction selected at step 1504, compares intensity of a signal received from a system device through the formed transmitting and receiving beam with a threshold value, and determines whether data can be transmitted and received. Here, by using the beam index selected at step 1504, the probe device 1300 forms a transmitting and receiving beam, as in step 1506, but because an angle of the mechanical device has been changed at step 1510, the transmitting and receiving beam direction at step 1506 and the transmitting and receiving beam direction at step 1512 may be different.

If data can be transmitted and received to and from the system device in the selected beam direction, the probe device 1300 terminates a beamforming procedure according to this disclosure. If data cannot be transmitted and received to and from the system device in the selected beam direction, by performing a beamforming protocol in an entire direction of the mechanical device, the probe device 1300 selects a beam direction (1514). For example, while changing an angle and location of the mechanical module 1430 by a preset value, the probe device 1300 performs beam training in an entire transmitting and receiving beam direction that can form through an antenna and select a beam direction in which a signal transmitting and receiving performance with the system device is best based on a beam training result.

When a probe device that supports beamforming detects a direction change, the probe device limits a search area for performing beam training based on a previously used beam direction and direction change information, performs beam training in the limited search area, determines a beam direction by performing beam training based on electrical beamforming, performs mechanical beamforming based on the determined electrical beam direction, or performs mechanical beamforming based on direction change information detected by a direction sensor, thereby extending a communication coverage area of an antenna provided in the probe device, and thus even when an antenna including only the small number of elements is provided, by changing a beam direction appropriately to a situation in which the probe device is rapidly changed in several directions, the probe device communicates with the system device, and when several antennas are provided or when receiving diversity exists, a beam training time is remarkably reduced.

Although exemplary embodiments of the present disclosure have been described in detail hereinabove, it should be clearly understood that many variations and modifications of the basic inventive concepts herein described, which may appear to those skilled in the art, will still fall within the spirit and scope of the exemplary embodiments of the present disclosure as defined in the appended claims.

Methods according to exemplary embodiments described in a specification or claims of the present disclosure can be implemented in a form of hardware, software, or a combination of hardware and software.

When implemented with software, a computer readable storage medium that stores at least one program (software module) may be provided. At least one program stored at a computer readable storage medium is configured for execution by at least one processor within an electronic device. At least one program includes instructions that enable an electronic device to execute methods according to exemplary embodiments described in a specification or claims of the present disclosure.

A computer readable medium may include, individually or in combination, a program command, a data file, and a data structure. The program command may be especially designed and configured for the present disclosure or may be known and used to a person of ordinary skill in the art. The computer readable record medium may include, for example, a magnetic medium such as a hard disk, a floppy disk, and a magnetic tape, an optical recording medium such as a Compact Disk Read-Only Memory (CD-ROM) or a Digital Versatile Disk (DVD), a magnetic-optical medium such as a floptical disk, and a hardware device specially configured to store and perform a program command such as a ROM, a Random-Access Memory (RAM), and a flash memory. A program instruction can include, for example, a high-level language code that may be executed by a computer using an interpreter as well as a machine language code formed by a compiler. When a portion or the entire of a base station or a relay described in the present disclosure is implemented with a computer program, a computer readable record medium that stores the computer program is included in the present disclosure. Therefore, the scope of the present disclosure is not limited to the described exemplary embodiment but should be determined by the appended claims and their equivalents.

What is claimed is:

1. A method of beamforming in a wireless communication device for communicating with a peer device, the method comprising:
   detecting a change from a first direction to a second direction of the wireless communication device based on direction change information by a direction sensor included in the wireless communication device, the first direction being for communicating with the peer device;
   identifying a limited area for beam training based on the first direction and the direction change information;
   identifying a beam in a first beam direction by performing the beam training within the limited area, wherein the beam in the first beam direction is a beam with a largest signal reception intensity within the limited area;
   determining whether a first signal reception intensity of the beam in the first beam direction within the limited area is greater than or equal to a threshold or not;
   in response to the first signal reception intensity being less than the threshold, adjusting an angle of a mechanical device for adjusting a beam direction based on information on the first beam direction of the beam and a beam index of the beam in the first beam direction, wherein the mechanical device is included in the wireless communication device;

determining whether a second signal reception intensity of the beam in a second beam direction according to the adjusted angle of the mechanical device is greater than or equal to the threshold or not; and in response to the second signal reception intensity being greater than or equal to the threshold, communicating with the peer device using the beam in the second beam direction, wherein the beam index is information for a beam direction of a plurality of beam directions formed by the wireless communication device.

2. The method of claim 1, wherein the adjusting the angle of the mechanical device is adjusted based on information on the second direction of the mechanical device.

3. The method of claim 1, wherein the angle of the mechanical device included in the wireless communication device is adjusted based on a measurement result of the direction sensor included in the wireless communication device.

4. The method of claim 3, wherein the measurement result of the direction sensor comprises at least one of: azimuth offset, elevation offset, x-axis distance offset, y-axis distance offset, and z-axis distance offset between the first direction and the second direction.

5. The method of claim 3, further comprising:

in response to the second signal reception intensity being less than the threshold, changing the angle of the mechanical device by a preset value.

6. A wireless communication device comprising:

a transceiver configured to communicate with a peer device using a first beam; and at least one processor configured to:

detect a change from a first direction to a second direction of the wireless communication device based on direction change information by a direction sensor included in the wireless communication device, the first direction being for communicating with the peer device, identify a limited area for beam training based on the first direction and the direction change information, identify a beam in a first beam direction by performing the beam training within the limited area, wherein the beam in the first beam direction is a beam with a largest signal reception intensity within the limited area, determine whether a first signal reception intensity of the first beam in the first beam direction within the limited area is greater than or equal to a threshold or not, in response to the first signal reception intensity being less than the threshold, adjust an angle of a mechanical device for adjusting a beam direction based on information on the first beam direction of the beam and a beam index of the beam in the first beam direction, the mechanical device included in the wireless communication device, and determine whether a second signal reception intensity of the beam in a second beam direction according to the adjusted angle of the mechanical device is greater than or equal to the threshold or not, wherein the transceiver is configured to communicate with the peer device using the beam in the second beam direction in response to the second signal reception intensity being greater than or equal to the threshold, and wherein the beam index is information for a beam direction of a plurality of beam directions formed by the wireless communication device.

7. The wireless communication device of claim 6, wherein the at least one processor is configured to adjust the angle of the mechanical device is adjusted based on information on the second direction of the mechanical device.

8. The wireless communication device of claim 6, wherein the angle of the mechanical device connected to the wireless communication device is adjusted based on a measurement result of the direction sensor included in the wireless communication device.

9. The wireless communication device of claim 8, wherein the measurement result of the direction sensor comprises at least one of: azimuth offset, elevation offset, x-axis distance offset, y-axis distance offset, or z-axis distance offset between the first direction and the second direction.

10. The wireless communication device of claim 8, wherein the at least one processor is further configured to change the angle of the mechanical device by a preset value in response to the second signal reception intensity being less than the threshold.

* * * * *